(12) United States Patent
Kawabata et al.

(10) Patent No.: US 9,894,295 B2
(45) Date of Patent: Feb. 13, 2018

(54) IMAGING DEVICE AND IMAGING SYSTEM

(71) Applicant: CANON KABUSHIKI KAISHA, Tokyo (JP)

(72) Inventors: Kazunari Kawabata, Kawasaki (JP); Takeshi Ichikawa, Hachioji (JP); Masahiro Kobayashi, Tokyo (JP); Yusuke Onuki, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/237,255

(22) Filed: Aug. 15, 2016

(65) Prior Publication Data
US 2017/0078594 A1 Mar. 16, 2017

(30) Foreign Application Priority Data
Sep. 11, 2015 (JP) .................................. 2015-179347

(51) Int. Cl.
*H04N 5/355* (2011.01)
*H04N 5/3745* (2011.01)
(Continued)

(52) U.S. Cl.
CPC ....... *H04N 5/35554* (2013.01); *H04N 5/2353* (2013.01); *H04N 5/3535* (2013.01);
(Continued)

(58) Field of Classification Search
CPC .. H04N 5/2353; H04N 5/2355; H04N 5/3535; H04N 5/35554; H04N 5/35563;
(Continued)

(56) References Cited

U.S. PATENT DOCUMENTS 7,271,835 B2    9/2007  Iizuka et al.
7,436,343 B2    10/2008 Ichikawa
(Continued)

FOREIGN PATENT DOCUMENTS

JP    2004-111590    4/2004
JP    2006-246450    9/2006

OTHER PUBLICATIONS

U.S. Appl. No. 15/136,017, filed Apr. 22, 2016.
(Continued)

*Primary Examiner* — Lin Ye
*Assistant Examiner* — Chriss Yoder, III
(74) *Attorney, Agent, or Firm* — Fitzpatrick, Cella, Harper & Scinto

(57) ABSTRACT

An imaging device includes pixels including a photoelectric conversion unit, a holding unit that holds charge, and an amplifier unit. The pixels include a first group outputting a signal based on charge generated during a first exposure period, and a second group outputting a signal based on charge generated during a second exposure period longer than the first exposure period. The pixel belonging to the second group includes in the second exposure period a first period during which the charge generated in the photoelectric conversion unit is accumulated in the photoelectric conversion unit, and the charge held by the holding unit is transferred to the amplifier unit, and a second period during which the charge generated during the first period is held in the holding unit, and the charge generated after the first period is held by one of the photoelectric conversion unit and the holding unit.

19 Claims, 16 Drawing Sheets

(51) Int. Cl.
*H04N 5/235* (2006.01)
*H04N 5/353* (2011.01)
*H04N 5/369* (2011.01)

(52) U.S. Cl.
CPC ....... *H04N 5/3696* (2013.01); *H04N 5/37452* (2013.01); *H04N 5/37457* (2013.01)

(58) Field of Classification Search
CPC ............ H04N 5/3696; H04N 5/37452; H04N 5/37457
See application file for complete search history.

(56) References Cited

U.S. PATENT DOCUMENTS

| | | | |
|---|---|---|---|
| 7,462,810 B2 | 12/2008 | Kobayashi | |
| 7,687,299 B2 | 3/2010 | Ichikawa | |
| 7,928,477 B2 | 4/2011 | Kobayashi | |
| 7,935,995 B2 | 5/2011 | Watanabe | |
| 7,968,922 B2 | 6/2011 | Ichikawa | |
| 8,045,034 B2 | 10/2011 | Shibata | |
| 8,063,351 B2 | 11/2011 | Kobayashi | |
| 8,115,848 B2 | 2/2012 | Onuki | |
| 8,174,604 B2 | 5/2012 | Shibata | |
| 8,222,682 B2 | 7/2012 | Watanabe | |
| 8,259,206 B1 | 9/2012 | Shibata | |
| 8,289,432 B2 | 10/2012 | Shibata | |
| 8,357,956 B2 | 1/2013 | Kobayashi | |
| 8,427,564 B2 | 4/2013 | Yamashita | |
| 8,456,559 B2 | 6/2013 | Yamashita | |
| 8,552,353 B2 | 10/2013 | Kobayashi | |
| 8,723,232 B2 | 5/2014 | Kobayashi | |
| 8,736,734 B2 | 5/2014 | Onuki | |
| 8,779,544 B2 | 7/2014 | Yamashita | |
| 8,884,391 B2 | 11/2014 | Fudaba | |
| 9,147,708 B2 | 9/2015 | Okita | |
| 9,153,610 B2 | 10/2015 | Kobayashi | |
| 9,276,027 B2 | 3/2016 | Okita | |
| 9,344,653 B2 | 5/2016 | Shimotsusa | |
| 9,419,038 B2 | 8/2016 | Kobayashi | |
| 9,445,026 B2 | 9/2016 | Kobayashi | |
| 9,451,173 B2 * | 9/2016 | Kang | H04N 5/2353 |
| 2007/0285526 A1 * | 12/2007 | Mann | H04N 5/23245 348/222.1 |
| 2008/0173794 A1 * | 7/2008 | Oike | H04N 5/335 250/208.1 |
| 2008/0198251 A1 * | 8/2008 | Xu | H04N 5/3532 348/297 |
| 2011/0136291 A1 | 6/2011 | Iwata | |
| 2013/0206965 A1 | 8/2013 | Yamashita | |
| 2014/0061436 A1 | 3/2014 | Kobayashi | |
| 2015/0222836 A1 | 8/2015 | Wada | |
| 2015/0264283 A1 | 9/2015 | Kobayashi | |
| 2015/0281614 A1 | 10/2015 | Yoshida | |
| 2016/0027825 A1 | 1/2016 | Moriyama | |
| 2016/0071896 A1 | 3/2016 | Kawabata | |
| 2016/0071902 A1 | 3/2016 | Okita | |
| 2016/0155774 A1 | 6/2016 | Hasegawa | |
| 2016/0227139 A1 | 8/2016 | Shimotsusa | |

OTHER PUBLICATIONS

U.S. Appl. No. 15/137,474, filed Apr. 25, 2016.
U.S. Appl. No. 15/163,986, filed May 25, 2016.
U.S. Appl. No. 15/251,341, filed Aug. 30, 2016.
U.S. Appl. No. 15/207,289, filed Jul. 11, 2016.
U.S. Appl. No. 15/226,651, filed Aug. 2, 2016.
U.S. Appl. No. 15/237,272, filed Aug. 15, 2016.

\* cited by examiner

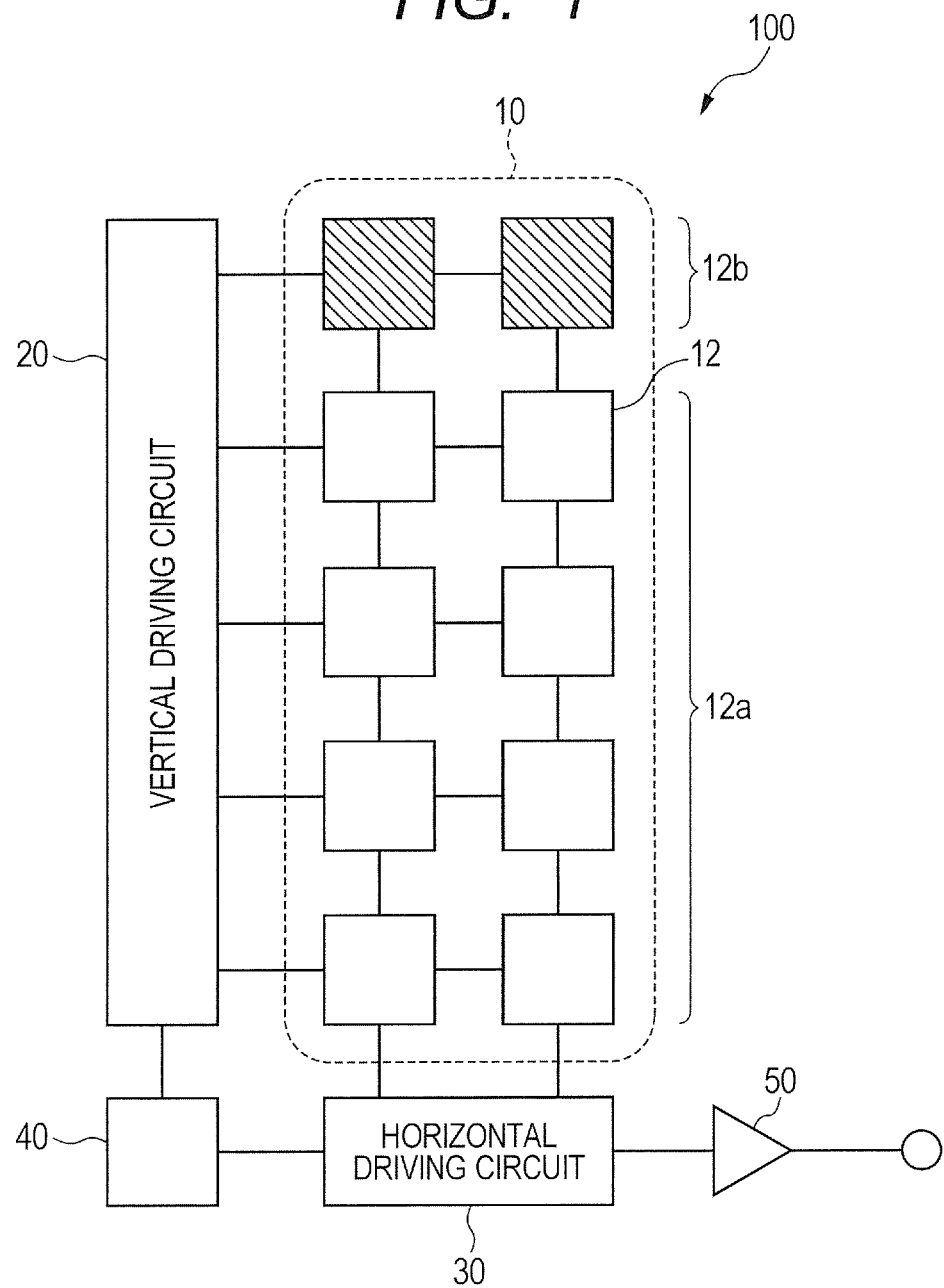

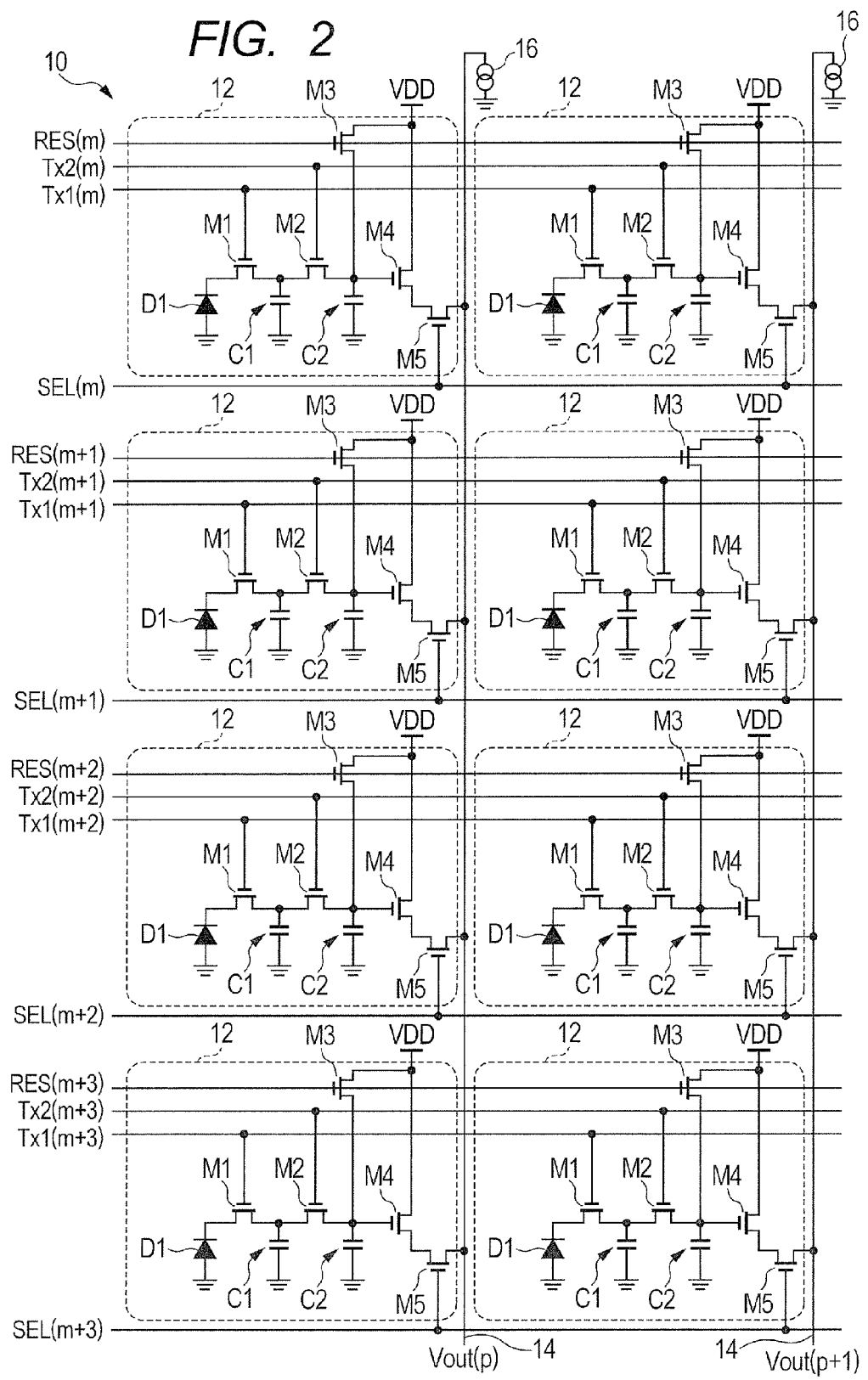

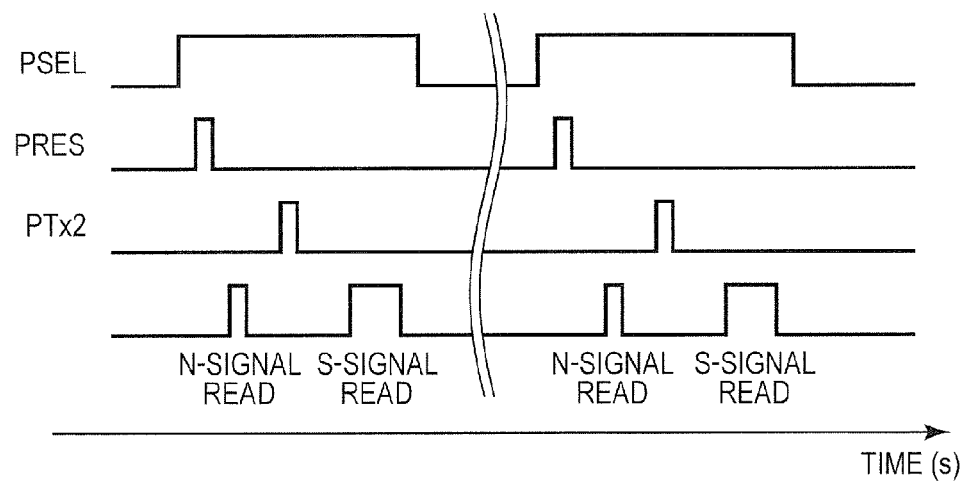
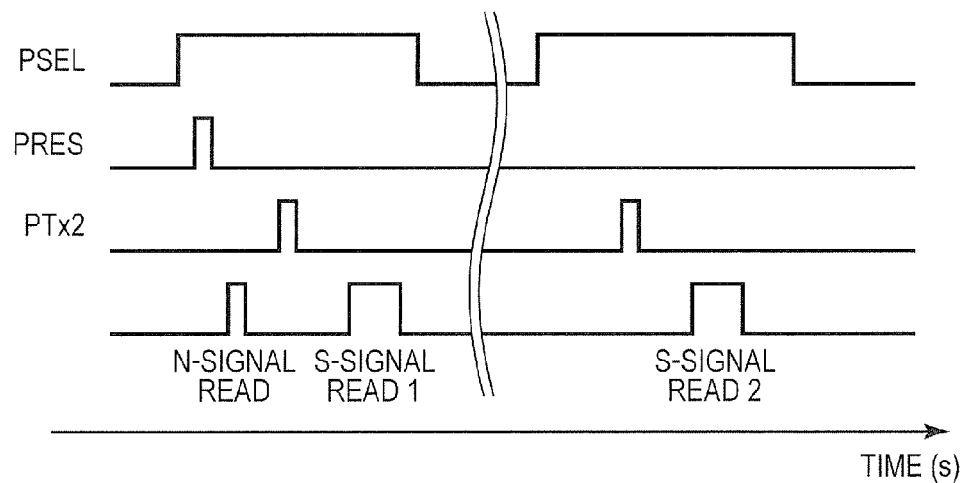

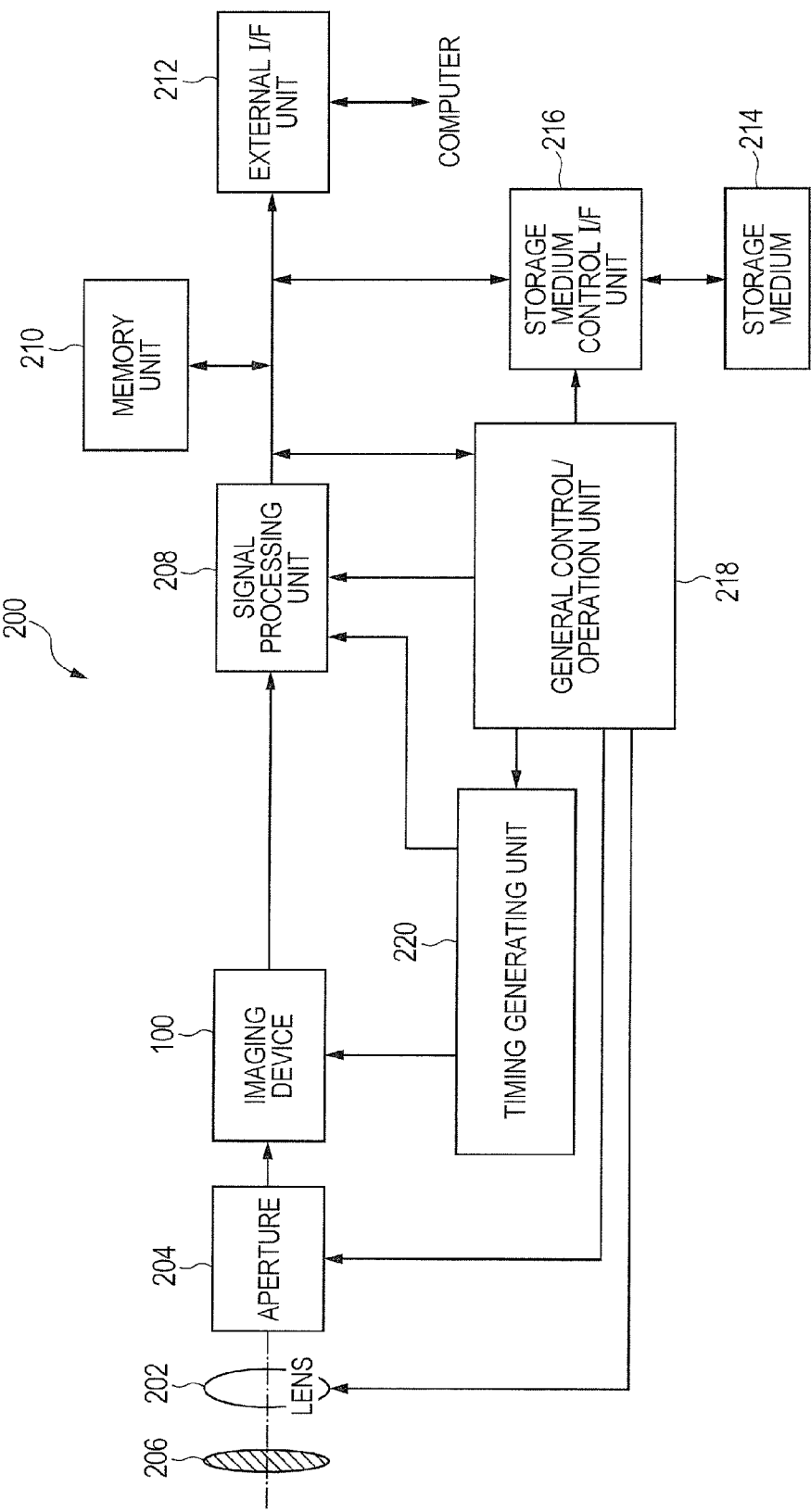

IMAGING DEVICE AND IMAGING SYSTEM

BACKGROUND OF THE INVENTION

Field of the Invention

The present invention relates to an imaging device and an imaging system.

Description of the Related Art

In recent years, imaging through a global electronic shutter operation in a CMOS image sensor has been proposed. Japanese Patent Application Laid-Open Nos. 2004-111590 and 2006-246450 describe imaging devices that include global electronic shutter function. The imaging device including the global electronic shutter function has an advantage of being resistant to distortion of an object image even when an object moving fast is imaged.

The inventors have found that the imaging devices including the global electronic shutter function require improvement in functionality, such as improvement in dynamic range through multiple exposure and speedup of focus detection on an imaging plane. However, as to the conventional imaging devices, no discussion has been made on configurations and driving methods of imaging devices suitable for such improvement in functionality.

SUMMARY OF THE INVENTION

An object of the present invention is to provide an imaging device that can achieve improvement in dynamic range and speedup of focus detection in imaging through use of a global electronic shutter.

According to an aspect of the present invention, there is provided an imaging device including a plurality of pixels, each of the plurality of pixels including a photoelectric conversion unit that generates charge by photoelectric conversion, a holding unit that holds charge transferred from the photoelectric conversion unit, and an amplifier unit that outputs a signal based on charge transferred from the holding unit, wherein the plurality of pixels includes a first group including the pixel that outputs a signal based on charge generated in the photoelectric conversion unit during a first exposure period in each of frames, and a second group including the pixel that outputs a signal based on charge generated in the photoelectric conversion unit during a second exposure period in each of the frames, the second exposure period is longer than the first exposure period, and at least a part of the second exposure period overlaps with the first exposure period, and the pixel belonging to the second group includes in the second exposure period a first period during which the charge generated in the photoelectric conversion unit is accumulated in the photoelectric conversion unit, and the charge held by the holding unit is transferred to the amplifier unit, and a second period during which the charge generated in the photoelectric conversion unit during the first period is held in the holding unit, and the charge generated in the photoelectric conversion unit after the first period is held by one of the photoelectric conversion unit and the holding unit.

According to another aspect of the present invention, there is provided a method of driving an imaging device including a plurality of pixels, each of the plurality of pixels including a photoelectric conversion unit that generates charge by photoelectric conversion, a holding unit that holds charge transferred from the photoelectric conversion unit, and an amplifier unit that outputs a signal based on charge transferred from the holding unit, wherein the method includes for the pixel belonging to a first group of the plurality of pixels, accumulating in the photoelectric conversion unit charge generated in the photoelectric conversion unit during a first exposure period in each frame, and after the first exposure period, transferring from the holding unit to the amplifier unit the charge generated in the photoelectric conversion unit during the first exposure period, and for the pixel belonging to a second group of the plurality of pixels, during a first period in a second exposure period in each frame, accumulating in the photoelectric unit the charge generated in the photoelectric conversion unit, and transferring to the amplifier unit the charge held by the holding unit, during a second period in the second exposure period, holding in the holding unit the charge generated in the photoelectric conversion unit during the first period, and holding by one of the photoelectric conversion unit and the holding unit the charge generated in the photoelectric conversion unit during the second period, and after the second exposure period, transferring from the holding unit to the amplifier unit the charge generated in the photoelectric conversion unit during the first period and the second period.

Further features of the present invention will become apparent from the following description of exemplary embodiments with reference to the attached drawings.

BRIEF DESCRIPTION OF THE DRAWINGS

FIG. 1 is a block diagram illustrating a schematic configuration of an imaging device according to a first embodiment of the present invention.

FIG. 2 is a diagram illustrating a configuration example of a pixel circuit of the imaging device according to the first embodiment of the present invention.

FIGS. 6A and 6B are timing charts illustrating operations of the imaging device according to the first embodiment of the present invention.

FIG. 16 is a block diagram illustrating a configuration of an imaging system according to a sixth embodiment of the present invention.

DESCRIPTION OF THE EMBODIMENTS

Embodiments of the present invention are hereinafter described with reference to the drawings. It is a matter of course that the embodiments according to the present invention are not limited to the embodiments described below. For instance, an example where a part of the configuration of any of the following embodiments is added to another embodiment, and an example where the part is replaced with the configuration of a part of the other embodiment are also embodiments of the present invention.

[First Embodiment]

Figure 3C:
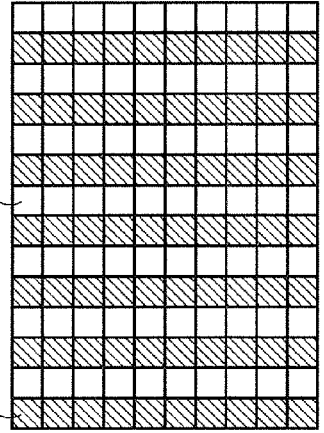
FIGS. 3A, 3B, 3C, 3D, 3E and 3F are diagrams illustrating examples of arrangement of pixels in a pixel array unit of the imaging device according to the first embodiment of the present invention.
Figure 3F:
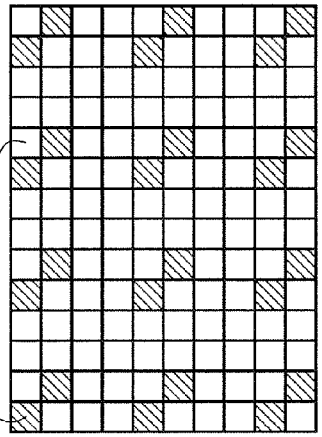
Figure 3B:
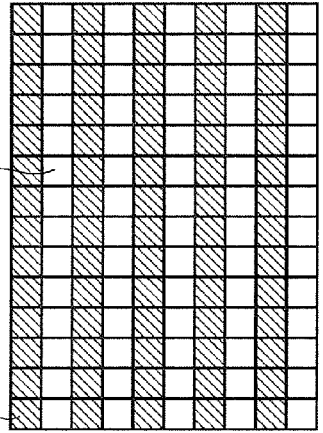
Figure 3E:
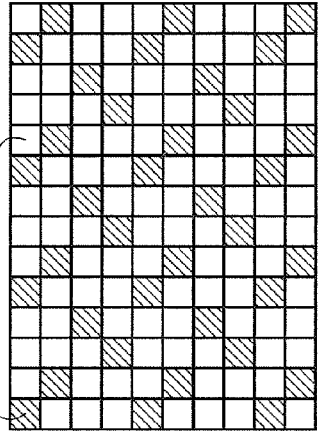
Figure 4:
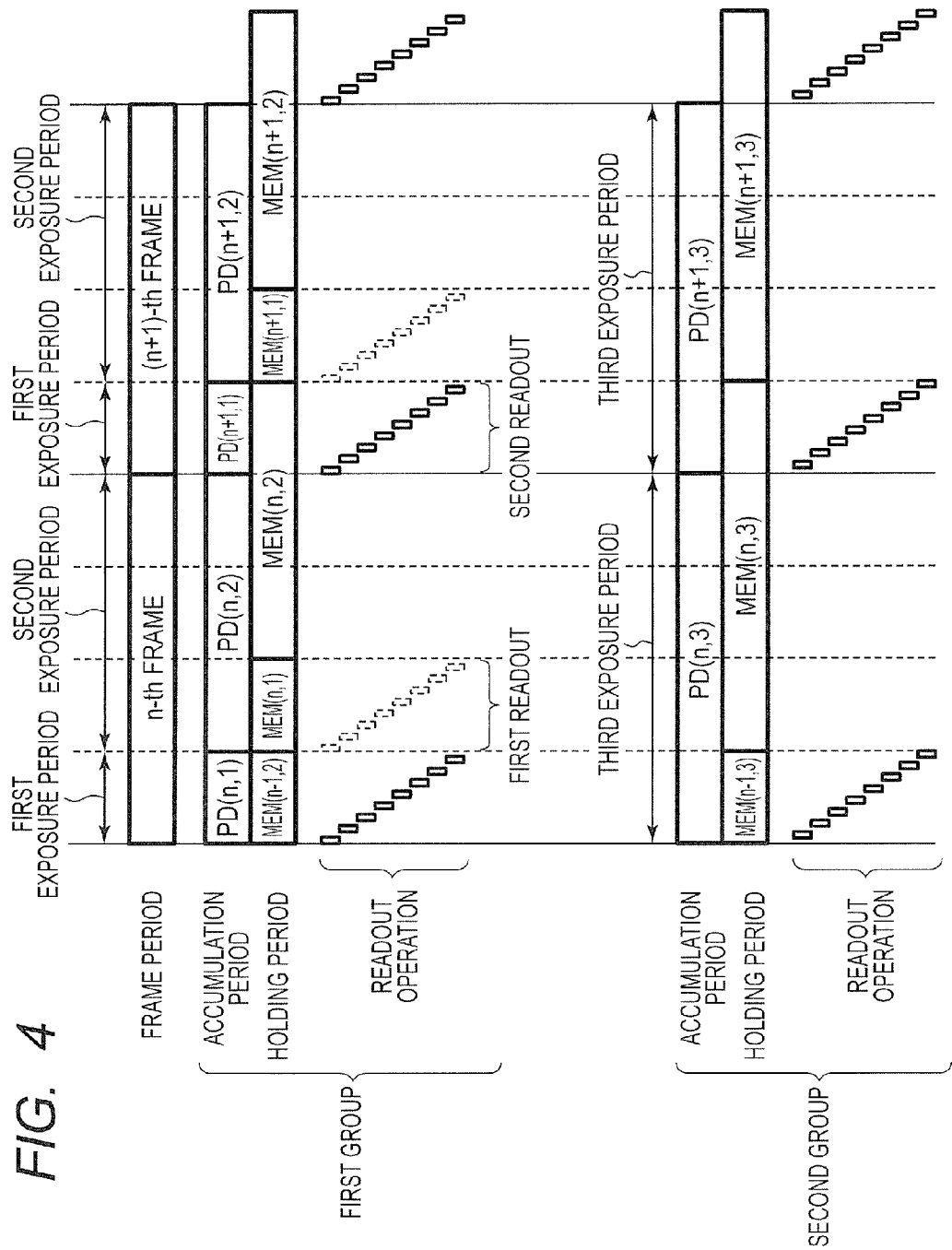
FIG. 4 is a schematic diagram illustrating an operation of the imaging device according to the first embodiment of the present invention.
Figure 5:
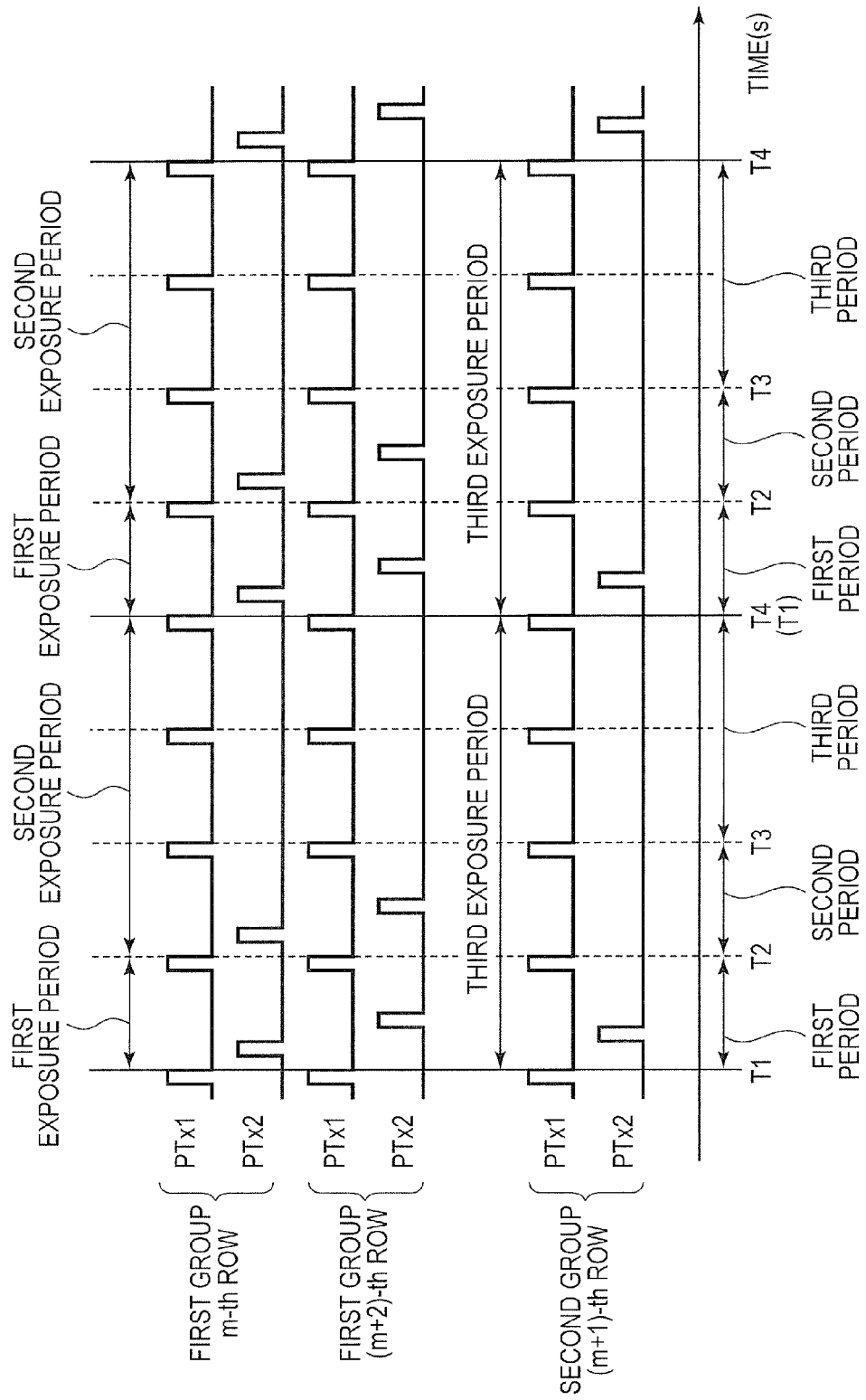
FIG. 5 is a timing chart illustrating the operation of the imaging device according to the first embodiment of the present invention.

An imaging device according to a first embodiment of the present invention is described with reference to FIGS. 1 to 6B. FIG. 1 is a block diagram illustrating a schematic configuration of the imaging device according to the present embodiment. FIG. 2 is a circuit diagram illustrating a configuration example of a pixel circuit of the imaging device according to the present embodiment. FIGS. 3A to 3F are diagrams illustrating examples of arrangement of pixels in a pixel array unit of the imaging device according to the present embodiment. FIG. 4 is a schematic diagram illustrating an operation of the imaging device according to the present embodiment. FIGS. 5 to 6B are timing charts illustrating operations of the imaging device according to the present embodiment.

First, the configuration of the imaging device according to the present embodiment is described, exemplifying a CMOS image sensor, with reference to FIGS. 1 and 2.

The imaging device 100 according to the present embodiment includes a pixel array unit 10, a vertical driving circuit 20, a horizontal driving circuit 30, a control circuit 40 and an output circuit 50, as illustrated in FIG. 1.

The pixel array unit 10 includes a plurality of pixels 12 arranged over a plurality of rows and a plurality of columns. Each pixel 12 includes a photoelectric conversion element that converts incident light into charge according to the amount of light. FIG. 1 illustrates a pixel array that includes ten pixels 12 arranged in five rows×two columns. However, in actuality, the array includes a further number of pixels 12.

The pixels 12 arranged in the pixel array unit 10 may include a readout target pixel group 12a, and a non-readout target pixel group 12b. The readout target pixel group 12a is a pixel group including pixels 12 for outputting signals used in a subsequent signal processing system. The signals to be used in the signal processing system include, for example, a signal to be used for an image (hereinafter, represented as "a signal for an image"), and a signal to be used for focus detection (hereinafter, represented as "a signal for focus detection"). The non-readout target pixel group 12b is a pixel group including pixels 12 whose outputs are not used for an image or focus detection. The non-readout target pixel group 12b is not necessarily provided.

The vertical driving circuit 20 is for driving a readout circuit in each pixel 12 when a signal is read from the pixel 12. The horizontal driving circuit 30 is for transferring the signal to the output circuit 50 sequentially for each column after the signal has been read from the pixel 12 and subjected to a desired signal processing as necessary. The signal processing performed by the horizontal driving circuit 30 may include an amplification process and an AD conversion process. The control circuit 40 is for controlling the vertical driving circuit 20 and the horizontal driving circuit 30. The output circuit 50 is a circuit for outputting the signals read from the pixels 12 to the outside.

FIG. 2 is a circuit diagram illustrating an example of a pixel circuit constituting the pixel array unit 10. FIG. 2 illustrates eight pixels 12 arranged in four rows×two columns corresponding to the readout target pixel group 12a in FIG. 1, as the pixels 12 constituting the pixel array unit 10. However, a further number of pixels 12 are included in actuality. In the following description, the rows of the pixel array may sometimes be indicated by row numbers from the top, such as the m-th row, (m+1)-th row, (m+2)-th row, and (m+3)-th row.

Each pixel 12 includes a photoelectric conversion unit D1, a transfer transistor M1, a transfer transistor M2, a reset transistor M3, an amplifier transistor M4 and a select transistor M5. An anode of a photodiode constituting the photoelectric conversion unit D1 is connected to a ground voltage line. A cathode of the photodiode is connected to a source of the transfer transistor M1. A drain of the transfer transistor M1 is connected to a source of the transfer transistor M2. A connection node between the drain of the transfer transistor M1 and the source of the transfer transistor M2 constitutes a charge holding unit C1. The diagram illustrates the holding unit C1 as a capacitor. A drain of the transfer transistor M2 is connected to a source of the reset transistor M3 and a gate of the amplifier transistor M4. A connection node of the drain of the transfer transistor M2, the source of the reset transistor M3 and the gate of the amplifier transistor M4 constitutes a charge holding unit C2. The diagram illustrates the holding unit C2 as a capacitor. The holding unit C2 is what is called a floating diffusion (FD). A drain of the reset transistor M3 and a drain of the amplifier transistor M4 are connected to the power source voltage line (VDD). A source of the amplifier transistor M4 is connected to a drain of the select transistor M5.

On each row of the pixel array of the pixel array unit 10, a control line Tx1, a control line Tx2, a control line RES and a control line SEL are arranged in a manner extending in the row direction (the horizontal direction in FIG. 2). The control line Tx1 is connected to a gate of the transfer transistor M1 of each of the pixels 12 arranged in the row direction, and constitutes a signal line common to these pixels 12. The control line Tx2 is connected to a gate of the transfer transistor M2 of each of the pixels 12 arranged in the row direction, and constitutes a signal line common to these pixels 12. The control line RES is connected to a gate of the reset transistor M3 of each of the pixels 12 arranged in the row direction, and constitutes a signal line common to these pixels 12. The control line SEL is connected to a gate of the select transistor M5 of each of the pixels 12 arranged in the row direction, and constitutes a signal line common to these pixels 12. In FIG. 2, the name of each control line is assigned the corresponding row number (e.g., Tx1($m$), Tx1($m$+1), Tx1($m$+2) and Tx1($m$+3)).

The control line Tx1, the control line Tx2, the control line RES and the control line SEL are connected to the vertical driving circuit 20. A control signal PTx1, which is a driving pulse for controlling the transfer transistor M1, is output to the control line Tx1 from the vertical driving circuit 20. A control signal PTx2, which is a driving pulse for controlling the transfer transistor M2, is output to the control line Tx2 from the vertical driving circuit 20. A control signal PRES, which is a driving pulse for controlling the reset transistor M3, is output to the control line RES from the vertical driving circuit 20. A control signal PSEL, which is a driving pulse for controlling the select transistor M5, is output to the control line SEL from the vertical driving circuit 20. In a typical example, when a high-level control signal is output from the vertical driving circuit 20, the corresponding transistor is on-state. When a low-level control signal is output from the vertical driving circuit 20, the corresponding transistor is off-state. These control signals are supplied from the vertical driving circuit 20 according to a predetermined timing signal from the control circuit 40. A logic circuit, such as a shift resistor or an address decoder, is adopted as the vertical driving circuit 20.

Output lines 14 are arranged on the respective columns of the pixel arrays of the pixel array unit 10 in a manner extending in the column direction (the vertical direction in FIG. 2). Each of the output lines 14 is connected to sources of the select transistors M5 of the pixels 12 arranged in the column direction, and constitutes a signal line common to these pixels 12. The select transistor M5 of the pixel 12 may be omitted. In this case, the output line 14 may be connected to the source of the amplifier transistor M4. A current source 16 is connected to the output line 14.

The photoelectric conversion unit D1 converts incident light into charge according to the amount of light (photoelectric conversion), and accumulates the charge generated by the photoelectric conversion. The transfer transistor M1 transfers the charge held by the photoelectric conversion unit D1 to the holding unit C1. The holding unit C1 holds the charge generated by the photoelectric conversion unit D1 in a place other than that of the photoelectric conversion unit D1. The transfer transistor M2 transfers the charge held by the holding unit C1 to the holding unit C2. The holding unit C2 holds the charge transferred from the holding unit C1, and sets the voltage of an input node of an amplifier unit (the gate of the amplifier transistor M4) to a voltage according to the capacitance and the amount of transferred charge. The reset transistor M3 resets the voltage of the holding unit C2. The select transistor M5 selects a pixel 12 from which the signal is to be output to the output line 14. The amplifier transistor M4 has a configuration that allows the drain to be supplied with a power source voltage and allows the source to be supplied with bias current from the current source 16 via the select transistor M5, and constitutes an amplifier unit (source follower circuit) where the gate serves as the input node. Consequently, the amplifier transistor M4 outputs, to the output line 14, a signal Vout based on the charge generated by the incident light.

This configuration allows the charge generated by the photoelectric conversion unit D1 to be accumulated in the photoelectric conversion unit D1 while the holding unit C1 holds the charge. Consequently, an imaging operation where the photoelectric conversion periods of the pixels coincide with each other can be achieved. This operation is called a global electronic shutter operation. The electronic shutter is electric control of accumulation of charge generated by incident light.

Next, a method of driving the imaging device according to the present embodiment is described with reference to FIGS. 3A to 6B. Here, the imaging operation in the case of taking video is described. However, the operation can be performed in an analogous manner also in the case of taking a still image.

In this specification, the names of group, time, period and exposure period are sometimes assigned numerals, such as first, second and third. These numerals are simply for convenience of description. Even with configuration elements having the same names assigned the same numerals, what is described in the specification is not necessarily intended to be the same as what is described in claims, for example.

In the method of driving the imaging device 100 according to the present embodiment, the readout target pixel groups 12a are divided into multiple groups including at least a first group and a second group, and different imaging operations are performed for the respective groups in the same period. In the following description, the case where the readout target pixel groups 12a include the first group and the second group is exemplified. Alternatively, the readout target pixel groups 12a may include three or more groups. In the imaging device 100 of the present embodiment, division of the readout target pixel groups 12a is for convenience to specify the difference in imaging operations. There is no difference in structure and function between pixels 12 belonging to the different groups.

In the present embodiment, the pixels 12 belonging to the first group and the pixels 12 belonging to the second group are used as pixels 12 that output signals based on charges accumulated in exposure periods different from each other. For example, the pixels 12 in the first group are pixels that output signals based on charges accumulated in a relatively shorter exposure time (hereinafter, represented as "short accumulation time signal"). The pixels 12 in the second group are pixels that output signals based on charges accumulated in a relatively longer exposure time (hereinafter, represented as "long accumulation time signal"). In this case, the short accumulation time signal output from the pixels 12 in the first group and the long accumulation time signal output from the pixels 12 in the second group can correspond to a low-sensitivity signal and a high-sensitivity signal, respectively. A wide dynamic range image can be obtained by combining images obtained from signals in different accumulation times.

The arrangement of the pixels 12 in the first group and the pixels 12 in the second group in the pixel array unit 10 is not specifically limited. For example, various arrangements illustrated in FIGS. 3A to 3F are applicable instead. In FIGS. 3A to 3F, hatched regions indicate the pixels 12 in the first group, and blank white regions indicate the pixels 12 in the second group.

Figure 3A:
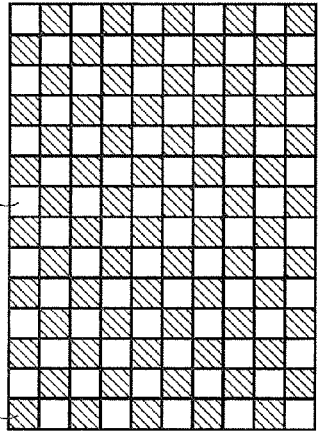
Figure 3D:
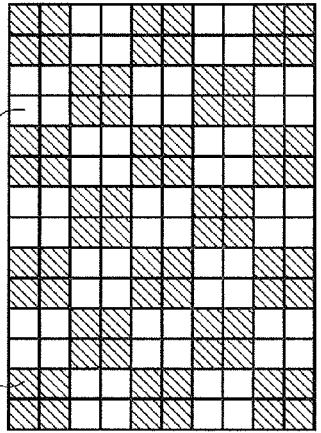

The arrangement illustrated in FIG. 3A is an example where the pixels 12 in the first group and the pixels 12 in the second group are arranged in a staggered check (houndstooth check) pattern. The arrangement illustrated in FIG. 3B is an example where the pixels 12 in the first group and the pixels 12 in the second group are arranged on alternate rows. The arrangement illustrated in FIG. 3C is an example where the pixels 12 in the first group and the pixels 12 in the second group are arranged on alternate columns. Thus, the pixels 12 that output signals with different accumulation times may be arranged on the same rows or the same column, or arranged in alternate rows or alternate columns. The arrangement illustrated in FIG. 3D is an example where four pixels serve as one unit block, unit blocks made up of the pixels 12 in the first group and unit blocks made up of the pixels 12 in the second group are arranged in a staggered check pattern. The arrangement illustrated in FIG. 3E is an arrangement example where the number of pixels 12 in the second group is three times as many as the number of pixels 12 in the first group. The arrangement illustrated in FIG. 3F is an arrangement example where the number of pixels 12 in the second group is seven times as many as the number of pixels 12 in the first group. For example, as illustrated in FIGS. 3E and 3F, the number of pixels 12 in the first group and the number of pixels 12 in the second group are not necessarily the same.

FIG. 4 is a schematic diagram illustrating transition of the operation state of the imaging device 100 according to lapse of time. The direction from the left to the right in the diagram corresponds to the temporal axis. FIG. 4 illustrates imaging operations in the n-th frame and the (n+1)-th frame for each of the pixels 12 in the first group and the pixels 12 in the second group.

Here, for the convenience of the following description, times T1, T2, T3 and T4 are defined in one frame period sequentially along the temporal axis. The time T1 is the start time of the frame. The time T4 is the end time of the frame. The period between times T1 and T2 is defined as a first period. The period between times T2 and T3 is defined as a second period. The period between times T3 and T4 is defined as a third period.

The imaging operation of the first group includes the first exposure period and the second exposure period in one frame period as illustrated in FIG. 4. The first exposure period corresponds to the first period, and is a relatively shorter exposure period. The second exposure period corresponds to the total periods of the second period and the third period, and is a relatively longer exposure period in comparison with the first exposure period. The second exposure period is started after the first exposure period.

The imaging operation of the first group includes accumulation periods PD (n, 1) and PD (n, 2) in one frame period. The accumulation period PD (n, 1) is a period during which the photoelectric conversion unit D1 generates or accumulates charge in the first exposure period. The accumulation period PD (n, 2) is a period during which the photoelectric conversion unit D1 generates or accumulates charges in the second exposure period.

The imaging operation for the first group includes a part of the holding period MEM (n−1, 2) and the holding periods MEM (n, 1) and a part of the MEM (n, 2) in one frame period. The holding period MEM (n−1, 2) is a period during which the holding unit C1 holds the charge generated by the photoelectric conversion unit D1 in the second exposure period in the previous frame (the (n−1)-th frame, not illustrated). The holding period MEM (n, 1) corresponds to the second period, and is a period during which the holding unit C1 holds the charge generated by the photoelectric conversion unit D1 during the first exposure period in the frame concerned (the n-th frame). The holding period MEM (n, 2) is a period during which the holding unit C1 holds the charge generated by the photoelectric conversion unit D1 during the second exposure period in the frame concerned. The holding period MEM (n, 2) corresponds to a period from the third period of the frame concerned to the first period of the next frame ((n+1)-th frame).

The imaging operation for the first group includes a first readout period and a second readout period. The period during which a signal readout operation based on charges accumulated in the first exposure period is performed is the first readout period. The period during which a signal readout operation based on charges accumulated in the second exposure period is performed is the second readout period. The first readout period is performed in the second period in the frame concerned. The second readout period is performed in the first period in the next frame. In the diagram, a period where a series of readout operations is performed from a row of pixels 12 is indicated by one rectangular symbol. The readout periods from the pixels 12 on different rows are represented at positions with different heights, thereby schematically indicating that the readout operation is sequentially performed row by row.

In the first group, the charge held by the holding unit C1 in the holding period MEM (n, 1) is sequentially transferred row by row to the holding unit C2 in the second period, and the readout operation is sequentially performed (first readout). The charge held by the holding unit C1 in the holding period MEM (n, 2) is sequentially transferred row by row to the holding unit C2 in the first period in the next frame, and the readout operation is sequentially performed (second readout). The second readout is not necessarily performed. Not all the pixels 12 belonging to the first group are necessarily read. Alternatively, only some of pixels 12 in the first group may be read.

Thus, the operation in one frame period of the pixels 12 in the first group includes a relatively shorter exposure period (hereinafter, also represented as "accumulation period for short time accumulation signal") and a relatively longer exposure period (hereinafter, also represented as "accumulation period for long time accumulation signal"). The accumulation period for short time accumulation signal corresponds to the first period. The accumulation period for long time accumulation signal corresponds to the total period of the second period and the third period. Alternatively, after the signal readout in the first period is finished, the operation of resetting the input node of the amplifier unit is not performed, which allows the accumulation period for long time accumulation signal to be the total period of the first period, the second period and the third period. That is, the charge generated in the first period and the charge generated in the second and third periods are added on the input node of the amplifier unit. The accumulation period for long time accumulation signal may be appropriately selected according to usage and imaging situations.

The charge of the long time accumulation signal in the previous frame held in the holding unit C1 is read in the first period. Consequently, after the first period has elapsed, the holding unit C1 can hold new charge. The charge of the short time accumulation signal held in the holding unit C1 are read in the second period. Consequently, after the second period has elapsed, the holding unit C1 can hold new charge. Therefore, the photoelectric conversion unit D1 is only required to accumulate at least more charge between the charge generated in the first period and the charge generated in the second period. Typically, the amount of charge generated in the first and second periods is smaller than the amount of charge generated in the exposure period in one frame, that is, the total period of the first period, the second period and the third period. Consequently, the saturation charge amount of the photoelectric conversion unit D1 can be reduced.

According to the driving method of the present embodiment, the third period during which the holding unit C1 holds the charge is longer than the first period and the second period. Consequently, the saturation charge amount of the photoelectric conversion unit D1 can be further reduced. Note that the first period, the second period and the third period may be equal to each other, or the first period and the second period may be longer than the third period. Alternatively, any combination of accumulation times can be adopted.

The imaging operation of the second group includes the third exposure period in one frame period as illustrated in FIG. 4. The third exposure period is substantially identical to one frame period, and overlaps with the first exposure period and the second exposure period. The third exposure period may be a relatively longer exposure period (accumulation period for long time accumulation signal) in comparison with the first exposure period and the second exposure period.

The imaging operation for the second group includes an accumulation period PD (n, 3) in one frame period. The accumulation period PD (n, 3) is a period during which the photoelectric conversion unit D1 generates or accumulates charge in the third exposure period.

The imaging operation of the second group includes a part of the holding period MEM (n−1, 3) and a part of the holding period MEM (n, 3) in one frame period. The holding period MEM (n−1, 3) is a period during which the holding unit C1 holds the charge generated by the photoelectric conversion unit D1 in the third exposure period of the previous frame. The holding period MEM (n, 3) is a period during which the holding unit C1 holds the charges generated by the photoelectric conversion unit D1 in the third exposure period of the frame concerned. The holding period MEM (n, 3) corresponds to a period from the second period in the frame concerned to the first period in the next frame.

The imaging operation of the second group includes one readout operation. In the second group, the charge held by the holding unit C1 in the holding period MEM (n, 3) is sequentially transferred row by row to the holding unit C2 in the first period of the next frame, and the readout operation is sequentially performed. Not all the pixels 12 belonging to the second group are necessarily read. Alternatively, only some of pixels 12 of the second group may be read.

Thus, the exposure period of the pixels 12 in the second group is the total period of the first period, the second period and the third period. As with the first group, the charge in the previous frame held in the holding unit C1 is read out in the first period. Consequently, after the first period has elapsed, the holding unit C1 can hold new charge. Therefore, the photoelectric conversion unit D1 is only required to accumulate at least charge generated in the first period. Typically, the amount of charge generated in the first periods is smaller than the amount of charge generated in the exposure period in one frame, that is, the total period of the first period, the second period and the third period. Consequently, the saturation charge amount of the photoelectric conversion unit D1 can be reduced.

According to the driving method of the present embodiment, the total period of the second period and the third period during which the holding unit C1 holds the charges is longer than the first period. Consequently, the saturation charge amount of the photoelectric conversion unit D1 can be further reduced. Note that the first period, the second period and the third period may be equal to each other, or the first period may be longer than the total period of the second period and the third period. Alternatively, any combination of accumulation times can be adopted.

FIG. 4 illustrates an example where a readout operation is performed sequentially from the pixels 12 on the first row. However, the order of performing the readout operation is not limited to this example. It is only required to read each of the pixels 12 constituting one frame of an image at least one time in each of the first period and the second period.

Thus, the pixels 12 in the first group are subjected to the readout operation in each of the first period and the second period. The pixels 12 in the second group are subjected to the readout operation in the first period. Consequently, in the readout operation for one frame, the short time accumulation signal and the long time accumulation signal can be read.

In the readout operation in FIG. 4, immediately after exposure for one frame is finished, exposure for the next frame can be started. Consequently, a period without information can be almost eliminated, which can improve the image quality.

In the first period and the second period during which the photoelectric conversion unit D1 accumulates charge, the readout operation is performed for each of the pixels 12. Consequently, even with a small saturation charge amount of the photoelectric conversion unit D1, the saturation charge amount of the pixels 12 can be increased. The saturation charge amount of the pixels 12 is the maximum value of the amount of charge that can be processed as a signal among charge generated in one time of exposure. The saturation charge amount of the photoelectric conversion unit D1 and the saturation charge amount of the holding unit C1 are the maximum value of the amount of charge that can be accumulated in the photoelectric conversion unit D1 and the maximum value of the amount of charge that can be held in the holding unit C1, respectively.

FIG. 5 schematically illustrates one example of driving pulses used for the method of driving the imaging device according to the present embodiment. FIG. 5 illustrates the control signal PTx1 supplied to the control line Tx1 of the transfer transistors M1, and the control signal PTx2 supplied to the control line Tx2 of the transfer transistors M2, for each of the pixels 12 in the first group and the pixels 12 in the second group. When the control signal is at the high level, the corresponding transistor is on-state. When the control signal is at the low level, the corresponding transistor is off-state.

FIG. 5 assumes the case where the pixels 12 in the first group and the pixels 12 in the second group are disposed in the arrangement illustrated in FIG. 3B, that is, the case where the pixels 12 in the first group and the pixels 12 in the second group are arranged on alternate rows. For example, in the case where the pixels 12 on the m-th row are in the first group, pixels on the (m+2)-th row, (m+4)-th row, . . . are pixels in the first group, and pixels on the (m+1)-th row, (m+3)-th row, . . . are pixels in the second group. The sequential readout operation in row by row alternately reads the pixels 12 in the first group and the pixels 12 in the second group, as illustrated in FIG. 4, for example.

First, driving of the pixels 12 in the first group is described.

In a period until the time T1, exposure for the previous frame (second exposure period) is performed. The exposure means that charge generated by photoelectric conversion is accumulated or held as a signal. The charge in the previous frame generated before the time T1 is held in the photoelectric conversion unit D1 and the holding unit C1. The control signal PTx1 is set to the high level to turn on the transfer transistor M1, thereby allowing all the charge generated in the exposure period for the previous frame to be transferred to the holding unit C1. At the time T1, the control signal PTx1 is set to the low level to simultaneously turn off the transfer transistors M1 in all the pixels 12, thereby allowing the exposure period for the previous frame to be finished.

After all the charge in the previous frame accumulated in the photoelectric conversion unit D1 and the holding unit C1 is transferred to the holding unit C1, the photoelectric conversion unit D1 becomes an initial state. That is, at the time T1, the photoelectric conversion units D1 of all the pixels 12 simultaneously, newly start to accumulate charge. Thus, according to the driving method of the present embodiment, the accumulation of charge in the photoelectric conversion unit D1 is started by turning off the transfer transistors M1. The time T1 is the start time of the first exposure period for the pixels 12 in the first group.

The signals of the previous frame based on the charge transferred to the holding unit C1 by the time T1 are sequentially read out after the time T1 (second readout of the first group of the previous frame). That is, the control signal PTx2 is set to the high level to turn on the transfer transistor M2, thereby allowing the charge held in the holding unit C1 to be transferred to the holding unit C2. Consequently, the voltage of the input node of the amplifier unit (the gate of the amplifier transistor M4) is changed according to the capacitance of the holding unit C2 and the amount of transferred charge, and a signal based on the voltage of the input node is output to the output line 14. An analogous operation is performed for the readout target pixels 12 in the first group on a row-by-row basis. After all the readout target pixels 12 in the first group are read, the transfer transistors M1 and M2 of these pixels 12 are off-state.

The number of signals output in the first period may be appropriately changed according to the format of an image to be output. For example, in the case of taking moving image, signals may be output from the pixels 12 on rows the number of which conforms to a horizontal line used for one frame. In such an embodiment, signals are not necessarily output from all the pixels 12 included in the imaging device 100.

The transfer transistor M1 is maintained in an off-state from the time T1 at least to completion of the second readout of the first group in the previous frame. In the present embodiment, an example is described where the transfer transistors M1 in all the pixels 12 are maintained in the off-state. Alternatively, the transfer transistor M1 of at least one pixel 12 may be maintained in the off-state. Consequently, in the pixel 12 with the transfer transistor M1 being maintained in the off-state, charges generated in this period are accumulated in the photoelectric conversion unit D1. As the charges generated in this period are thus accumulated in the photoelectric conversion unit D1, the holding unit C1 can hold the charge having been generated before the time T1, while the transfer transistor M1 is in the off state.

Subsequently, after completion of the second readout of the first group of the previous frame, the control signal PTx1 is set to the high level to turn on the transfer transistor M1, thereby transferring the charge generated by the photoelectric conversion unit D1 after the time T1 to the holding unit C1. The charge generated while the transfer transistor M1 is on-state is immediately transferred from the photoelectric conversion unit D1 to the holding unit C1. In the present embodiment, an example is described where the transfer transistors M1 in all the readout target pixels 12 in the first group simultaneously transition from the off-state to the on-state. However, the transfer transistor M1 is only required to be turned on by the time T2. The transition timing may be different between rows. For example, the transfer transistors M1 may be turned on in an order from a pixel 12 on which the second readout operation of the previous frame has been finished.

At the time T2, the control signal PTx1 is set to the low level to simultaneously turn off the transfer transistors M1 in the pixels 12 in the first group, and the first exposure period is finished. The time T2 is an end time of the first exposure period in the pixels 12 in the first group. After all the charge held in the photoelectric conversion unit D1 is transferred to the holding unit C1, the photoelectric conversion unit D1 becomes the initial state. That is, at the time T2, the photoelectric conversion units D1 of the pixels 12 of the first group simultaneously, newly start to accumulate charge. The time T2 is the start time of the second exposure period for the pixels 12 in the first group. The period from the time T1 to the time T2 is the first period. The charge generated in the first exposure period is held in the holding unit C1 after the time T2. As the charge generated after the time T2 is thus accumulated in the photoelectric conversion unit D1, the holding unit C1 can hold the charge having been generated in the first exposure period, while the transfer transistor M1 is in the off-state.

The signals based on the charge transferred to the holding unit C1 by the time T2 are sequentially read out after the time T2 (first readout of the first group). That is, as with the second readout of the first group of the previous frame, the control signal PTx2 is set to the high level to turn on the transfer transistor M2, thereby allowing the charge held in the holding unit C1 to be transferred to the holding unit C2. Consequently, the voltage of the input node of the amplifier unit (the gate of the amplifier transistor M4) is changed according to the capacitance of the holding unit C2 and the amount of transferred charge, and a signal based on the voltage of the input node is output to the output line 14. An analogous operation is performed for the readout target pixels 12 in the first group on a row-by-row basis. Consequently, the signal based on the charge accumulated during the first exposure period is output as the short time accumulation signal. After all the readout target pixels 12 in the first group are read, the transfer transistors M1 and M2 of these pixels 12 are off-state.

The transfer transistor M1 is maintained in the off state from the time T2 at least to completion of the first readout of the first group. The charge generated in the photoelectric conversion unit D1 in a period after the time T2 until the transfer transistor M1 is turned on at the first time is accumulated in the photoelectric conversion unit D1.

After completion of the first readout of the first group, the control signal PTx1 is set to the high level to turn on the transfer transistor M1, thereby transferring the charge generated in the photoelectric conversion unit D1 after the time T2 to the holding unit C1. In the example of the present embodiment, as illustrated in FIG. 5, the transfer transistor M1 is turned on intermittently three times after the first readout of the first group. The falling timing of the control signal PTx1 in the first intermittent drive is the time T3. The falling timing of the control signal PTx1 in the third intermittent drive is the time T4. The period from the time T2 to the time T3 is the second period. The period from the time T3 to the time T4 is the third period. In this case, in the first intermittent drive, the charge accumulated in the photoelectric conversion unit D1 during the second period is transferred to the holding unit C1. Also in the intermittent drive thereafter, transfer of the charge from the photoelectric conversion unit D1 to the holding unit C1 is performed in an analogous manner. At the time T4 after the third intermittent drive, all the charge generated in the photoelectric conversion unit D1 during the second period and the third period is transferred to the holding unit C1.

The transfer transistor M1 is thus intermittently driven because the charge generated in the third exposure period need to be transferred to the holding unit C1 before the charge exceed the saturation charge amount of the photoelectric conversion unit D1. The interval of intermittent operations can be appropriately selected according to the saturation charge amount of the photoelectric conversion unit D1. According to an embodiment, the interval may be set to be the same as the first period or the second period. The intervals of the intermittent operations may be desired to be uniform.

The period of transferring the charge from the photoelectric conversion unit D1 to the holding unit C1 from the time T2 to the time T4 may be freely set only if the first readout of the first group has been finished. For example, the number of times when the transfer transistor M1 is intermittently turned on is not limited to three. Alternatively, any number of times is acceptable. The transfer transistor M1 may always be maintained in the on-state over the third period. In this case, the charge generated during the third period is immediately transferred from the photoelectric conversion unit D1 to the holding unit C1. In view of reduction in noise, an operation with a short period during which the transfer transistor M1 is on, for example, the aforementioned intermittent operation is appropriate.

Subsequently, at the time T4, the control signal PTx1 transitions from the high level to the low level, which simultaneously controls the transfer transistors M1 in all the readout target pixels 12 in the first group from the on-state to the off-state. The exposure period for one frame is thus finished. The time T4 is the end time of the second exposure period in the pixels 12 in the first group.

Subsequently, as with the second readout of the first group of the previous frame described above, in the first period of the next frame, a signal based on the charge generated in the second exposure period of the n-th frame is read (second readout in the first group). As described above, the second readout of the first group is not necessarily performed.

Thus, the exposure periods coincide with each other between all the readout target pixels 12 in the first group. That is, in all the readout target pixels 12 in the first group, the exposure is started at the time T1 and the exposure is finished at the time T4. At the time T4, the exposure for the next frame is started, and the operations from the time T1 to the time T4 are repeated thereafter.

Next, driving of the pixels 12 in the second group is described. Here, only the points different from the first group driving are described. The description on the same points is omitted.

The driving of the pixels 12 in the second group is different from the driving of the pixels 12 in the first group in that no signal is read in the second period. That is, in the second period, the high-level control signal PTx2 is not supplied to the transfer transistor M2. Consequently, the holding unit C1 finishes the second period while still holding the charge generated in the photoelectric conversion unit D1 during the first period. The transfer of the charge from the photoelectric conversion unit D1 to the holding unit C1 after the second period is the same as that in the pixels 12 in the first group. Subsequently, the transfer transistor M2 is not turned on until the time T4. Consequently, the exposure period of the pixels 12 in the second group (third exposure period) is the total period of the first period, the second period and the third period. The time T1 is the start time of the third exposure period. The time T4 is the end time of the third exposure period. The signal based on the charge generated during the third exposure period is read in the first period in the next frame, as with the second readout of the first group.

Next, a signal readout operation for one pixel 12 is described with reference to FIGS. 6A and 6B. FIGS. 6A and 6B schematically illustrate the timing of the control signals used to drive the imaging device 100. FIGS. 6A and 6B illustrate the control signal PSEL supplied to the select transistor M5, the control signal PRES supplied to the reset transistor M3, and the control signal PTx2 supplied to the transfer transistor M2. When the control signal is at the high level, the corresponding transistor is on-state. When the control signal is at the low level, the corresponding transistor is off-state.

FIG. 6A is a timing chart in the case of reading the signal corresponding to the accumulated charge in the second exposure period in the second readout of the pixels 12 in the first group. FIG. 6B is a timing chart in the case of reading the signal corresponding to the accumulated charges in the third exposure period in the second readout of the pixels 12 in the first group. In each diagram, the left side of the break line represents the operation of the first readout of the pixels 12 in the first group, and the right side of the break line represents the operation of the second readout of the pixels 12 in the first group. The operation of readout of the pixels 12 in the second group is analogous to the operation of the first readout of the pixels 12 in the first group.

In the first readout of the pixels 12 in the first group, according to the driving pulses illustrated in FIGS. 6A and 6B, pixel selection, reset, readout of a noise signal (N-signal read), transfer of charge, and readout of an optical signal (S-signal read) are sequentially performed.

As with the first readout of the pixels 12 in the first group, in the second readout of the pixels 12 in the first group illustrated in FIG. 6A, pixel selection, reset, readout of a noise signal (N-signal read), transfer of charge, and readout of an optical signal (S-signal read) are sequentially performed. In the operation in FIG. 6A, the holding unit C2 is reset (PRES) before transfer of the charge (PTx2). Consequently, the charge transferred from the holding unit C1 to the holding unit C2 during transfer of the charge is the charge generated during the second exposure period. The illustration of FIG. 5 described above assumes the readout operation in FIG. 6A.

In the second readout of the pixels 12 in the first group illustrated in FIG. 6B, pixel selection, transfer of charge, and readout of an optical signal (S-signal read) are sequentially performed. That is, during the second readout, the holding unit C2 is not reset before transfer of the charge. In the operation in FIG. 6B, reset is not performed before transfer of the charge. Consequently, the charge generated during the first exposure period remain in the holding unit C2 before transfer of the charge. Consequently, when the charge generated during the second exposure period is transferred from the holding unit C1 to the holding unit C2 in this state, the charge generated during the first exposure period and the charge generated during the second exposure period are thus transferred to the holding unit C2. That is, the second readout of the pixels 12 in the first group represented in FIG. 6B corresponds to readout of the signal corresponding to the accumulated charge in the third exposure period.

The signal thus output from the pixels 12 may be AD-converted at the outside of the imaging device 100, or AD-converted in the imaging device 100.

As described above, the exposure period of the pixels 12 in the second group (third exposure period) is longer than the exposure period of the pixels 12 in the first group (first exposure period). Consequently, the signals are read out from the pixels 12 in the first group and the pixels 12 in the second group, thereby allowing the short accumulation time signal and the long accumulation time signal to be obtained in the same frame. Use of images obtained from these signals can therefore obtain an image with an improved dynamic range. A signal based on charge accumulated during the second exposure period may be used as a signal with a short accumulation time.

Both the first exposure period for the pixels 12 in the first group and the third exposure period for the pixels 12 in the second group start at the time T1, and have an overlapping exposure period (first period). The start times of the exposure periods are thus aligned, which can reduce deviation in position of an object in the case of combining the image based on the signal output from the pixels 12 in the first group with the image based on the signal output from the pixels 12 in the second group. Consequently, a wide dynamic range image with small deviation in position of the object and without blocked up shadows and blown out highlights can be obtained.

The photoelectric conversion units D1 of the pixels 12 in the first group and the second group are only required to accumulate at least charge generated during the first period or the second period. Consequently, even if the saturation charge amount of the photoelectric conversion unit D1 is small, the saturation charge amount of the pixel 12 can be maintained. Such a configuration can therefore obtain a wide dynamic range image while maintaining the saturation charge amount of the pixel 12 and performing the global electronic shutter operation. It is appropriate that the third period during which the holding unit C1 of the pixel 12 holds the charge should be longer than the first period and the second period. Consequently, the saturation charge amount of the photoelectric conversion unit D1 can be further reduced.

In the pixel in the first group of the present embodiment, the first exposure period is a shorter exposure period than the second exposure period. However, only if the first exposure period is shorter than the exposure period (third exposure period) for the pixels in the second group, the first exposure period may be longer than the second exposure period.

The imaging device 100 of the present embodiment may have an operation mode for performing a rolling shutter operation. In the operation mode for performing the rolling shutter operation, accumulation of charge in the photoelectric conversion units D1 of the pixels 12 is sequentially started. Subsequently, the transfer transistors M1 in the pixels are sequentially controlled to be turned on. The imaging device 100 of the present embodiment may have an operation mode for performing another scheme of a global electronic shutter. The other scheme of global electronic shutter is an operation where the period during which the photoelectric conversion unit D1 accumulates charge equals to the exposure period.

As described above, according to the present embodiment, the global electronic shutter operation can be performed while improving the saturation charge amount of the pixels. Furthermore, an image with an improved dynamic range can be obtained.

[Second Embodiment]

Figure 7:
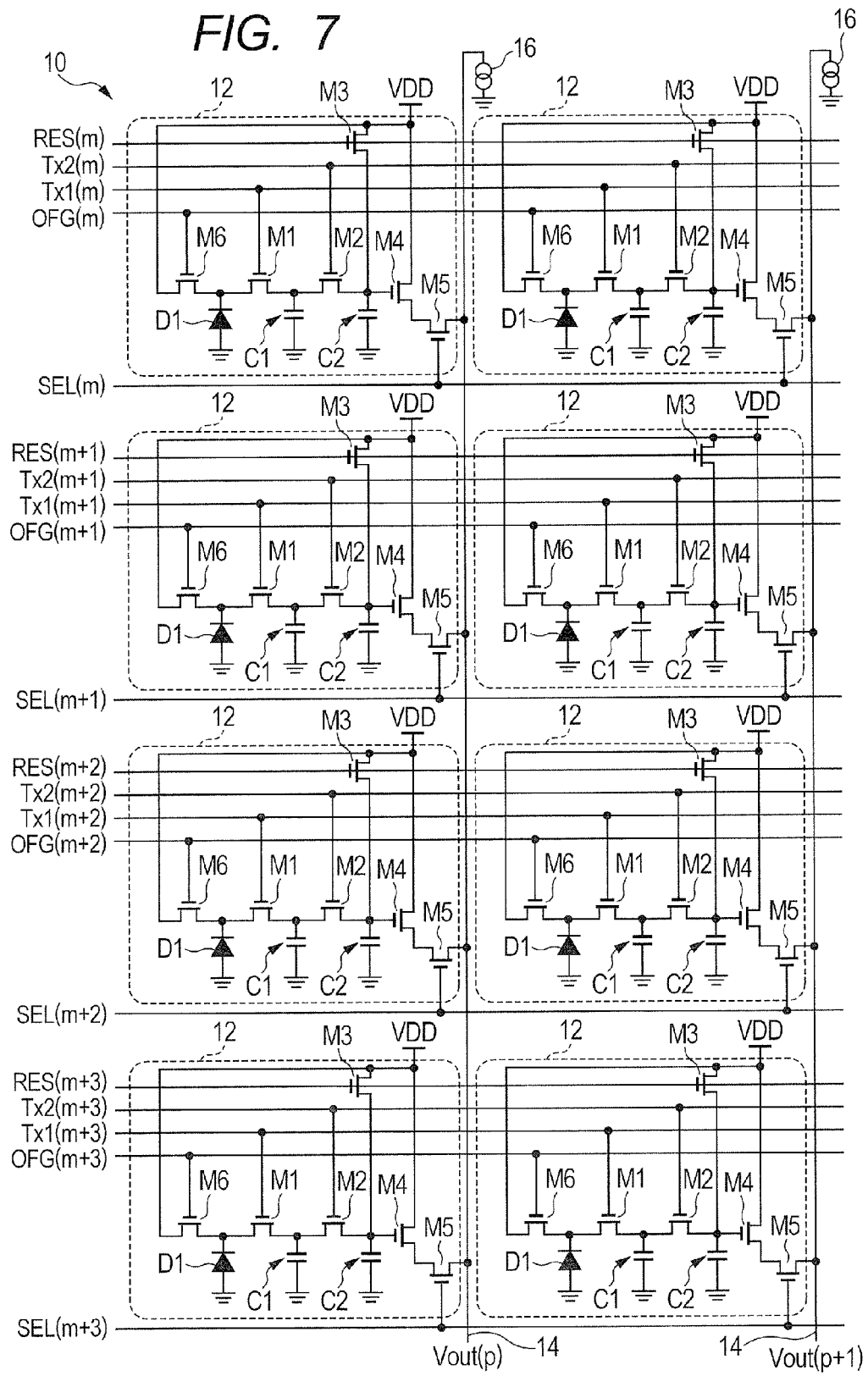
FIG. 7 is a diagram illustrating a configuration example of a pixel circuit of an imaging device according to a second embodiment of the present invention.
Figure 8:
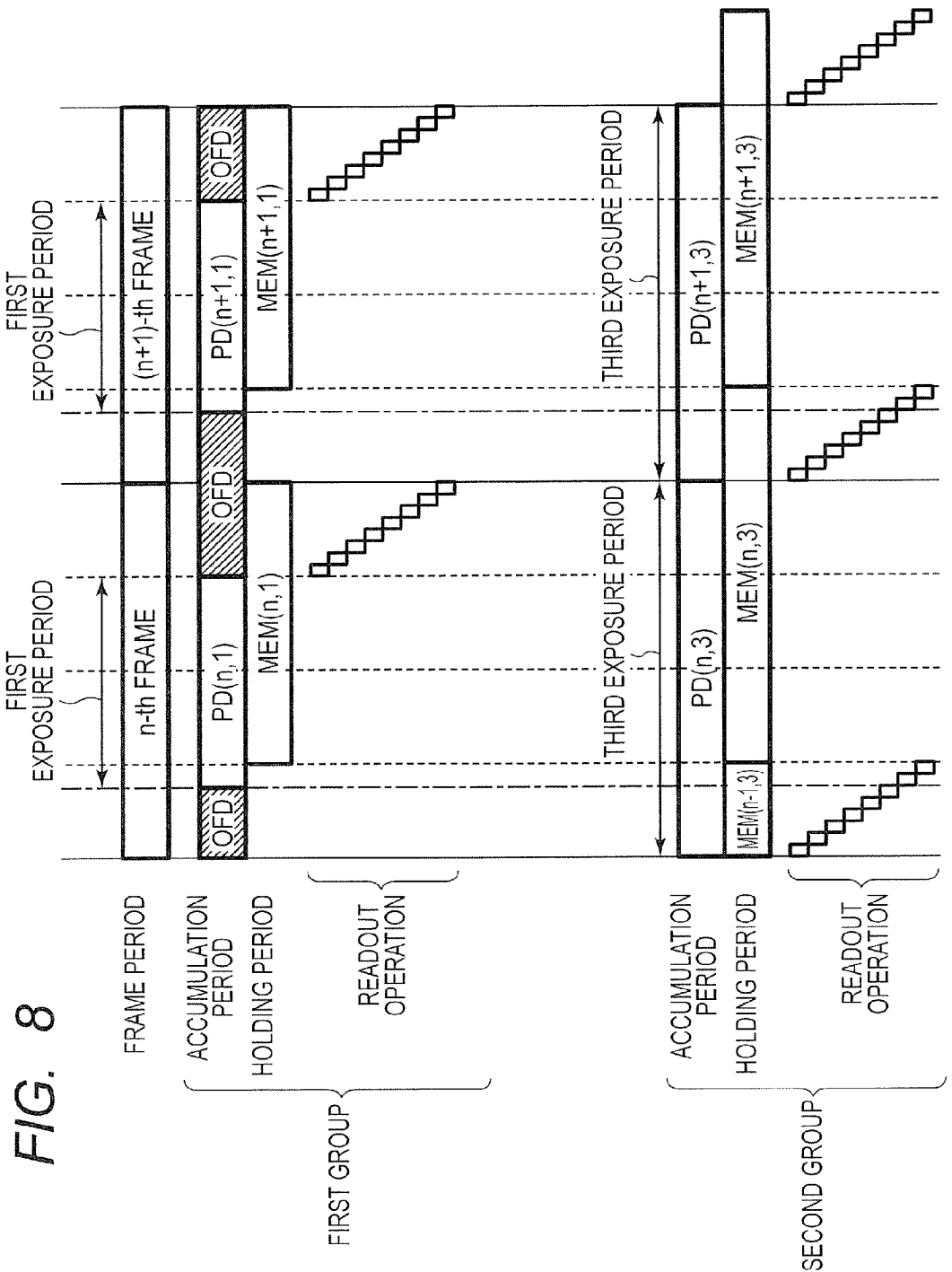
FIG. 8 is a schematic diagram illustrating an operation of the imaging device according to the second embodiment of the present invention.
Figure 9:
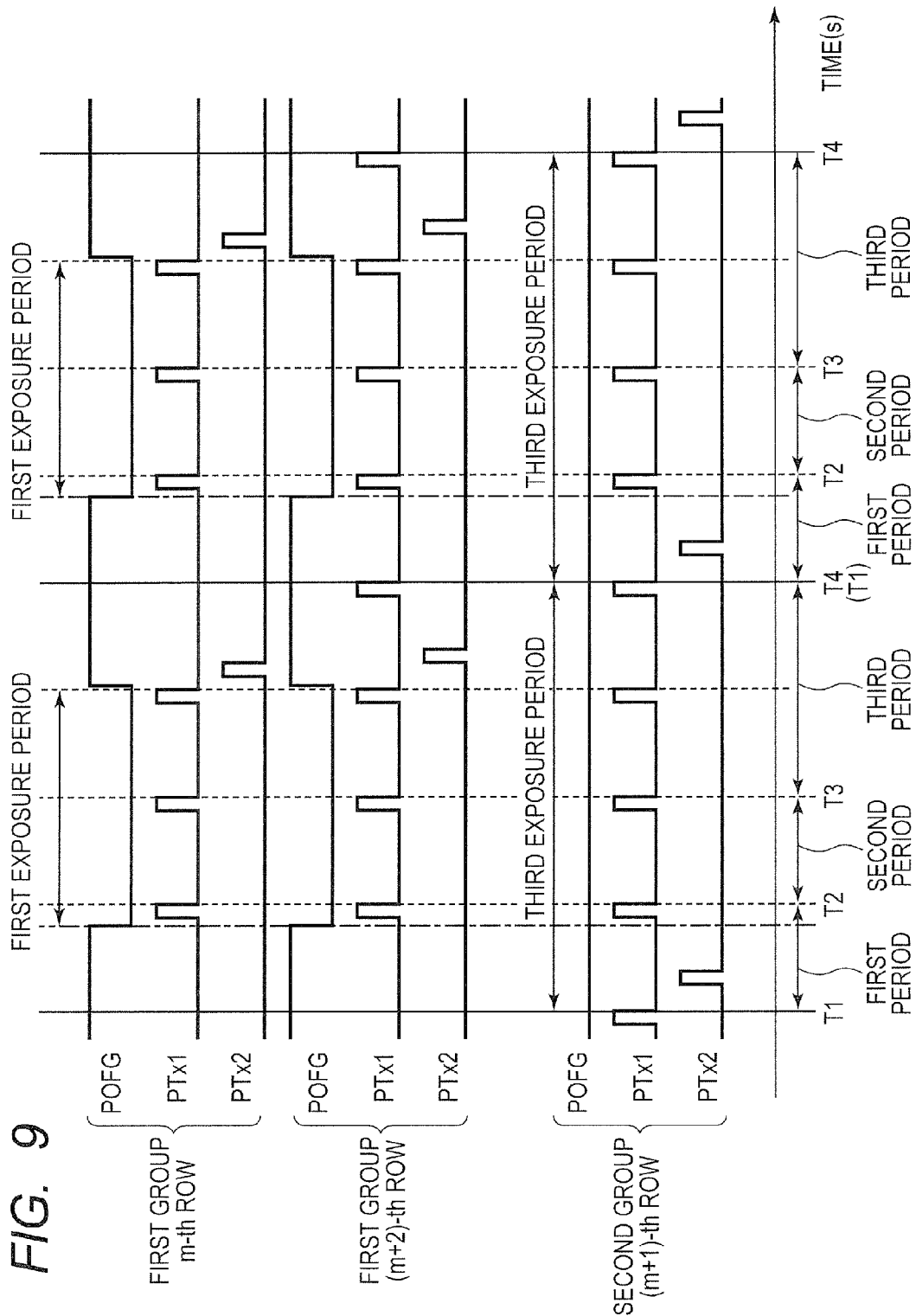
FIG. 9 is a timing chart illustrating the operation of the imaging device according to the second embodiment of the present invention.

An imaging device according to a second embodiment of the present invention is described with reference to FIGS. 7 to 9. The configuration elements analogous to those in the first embodiment illustrated in FIGS. 1 to 6B are assigned the same symbols. The description thereof is omitted or simplified. FIG. 7 is a circuit diagram illustrating a configuration example of a pixel circuit of the imaging device according to the present embodiment. FIG. 8 is a schematic diagram illustrating an operation of the imaging device according to the present embodiment. FIG. 9 is a timing chart illustrating operations of the imaging device according to the present embodiment.

First, the configuration of an imaging device 100 according to the present embodiment is described with reference to FIG. 7.

The imaging device 100 according to the present embodiment is analogous to the imaging device 100 according to the first embodiment except in that the circuit configuration of the pixel 12 is different. As illustrated in FIG. 7, the pixel 12 of the imaging device 100 according to the present embodiment includes a photoelectric conversion unit D1, transfer transistors M1 and M2, a reset transistor M3, an amplifier transistor M4 and a select transistor M5, and further includes an overflow transistor M6.

A source of the overflow transistor M6 is connected to the connection node between the cathode of the photodiode constituting the photoelectric conversion unit D1 and the source of the transfer transistor M1. A drain of the overflow transistor M6 is connected to the power source voltage line (VDD). A control line OFG is further arranged on each row of the pixel array of the pixel array unit 10. The control line OFG is connected to the gate of the overflow transistor M6 of each of the pixels 12 arranged in the row direction, and constitutes a signal line common to these pixels 12. The control line OFG is connected to the vertical driving circuit 20. A control signal POFG for controlling the overflow transistor M6 is output to the control line OFG from the vertical driving circuit 20. In a typical example, when a high-level control signal POFG is output from the vertical driving circuit 20, the overflow transistor M6 is on-state. When a low-level control signal is output from the vertical driving circuit 20, the overflow transistor M6 is off-state.

Next, a method of driving the imaging device according to the present embodiment is described with reference to FIGS. 8 and 9. The method of driving the imaging device according to the present embodiment is different from the method of driving the imaging device according to the first embodiment in that the start time of the exposure period for the pixels 12 in the first group is controlled by the overflow transistor M6. The imaging operation for the pixels 12 in the second group is basically analogous to that of the first embodiment. Here, the points different from the driving method in the first embodiment are mainly described. The description on the same points is omitted or simplified.

FIG. 8 is a schematic diagram illustrating transition of the operation state of the imaging device 100 according to lapse of time. The direction from the left to the right in the diagram corresponds to the temporal axis. FIG. 8 illustrates imaging operations in the n-th frame and the (n+1)-th frame for each of the first group and the second group.

As illustrated in FIG. 8, the imaging operation for the first group includes a first exposure period, an accumulation period PD (n, 1), a holding period MEM (n, 1), a discharge period OFD and a readout period for one time, in one frame period. The first exposure period is an exposure period relatively shorter than the third exposure period, which is the exposure period for the pixels 12 in the second group. The accumulation period PD (n, 1) is a period during which the photoelectric conversion unit D1 generates or accumulates charge in the first exposure period. The holding period MEM (n, 1) is a period during which the holding unit C1 holds the charge generated by the photoelectric conversion unit D1 during the first exposure period. The discharge period OFD is a period during which the overflow transistor M6 is on-state. The charge generated in the photoelectric conversion unit D1 during the discharge period OFD is discharged via the overflow transistor M6. Consequently, the charge is not accumulated in the photoelectric conversion unit D1. The readout operation for the pixels 12 in the first group is performed in the third period after the first exposure period.

The method of driving the imaging device 100 according to the present embodiment specifies the start time and the end time according to the duration of the first exposure period so that the first exposure period for the pixels 12 in the first group should be arranged in an intermediate period between the frames. In such a case, the start time of the first exposure period can be controlled by the timing of the control signal POFG. The end time of the first exposure period can be controlled by the timing of the control signal PTx1.

More specifically, the start time of the first exposure period can be specified by the timing of first transition of the control signal POFG from the high level to the low level after start of the frame period. The control signal POFG is set to the low level and the overflow transistor M6 is turned off. Accordingly, the charge generated in the photoelectric conversion unit D1 is not discharged via the overflow transistor M6 but is accumulated in the photoelectric conversion unit D1. The start time of the first exposure period is appropriately set according to the duration of the first exposure period so that the first exposure period should be disposed in the middle of the frame period. The first exposure period is shorter than the third exposure period. Consequently, the start time of the first exposure period is after the time T1.

The end time of the first exposure period can be specified by the timing when the control signal PTx1 transitions from the high level to the low level at the last time in the frame period, when the control signal POFG is at the low level. The exposure period is finished by the charge generated in the photoelectric conversion unit D1 being transferred to the holding unit C1. When the overflow transistor M6 is turned on, the photoelectric conversion unit D1 is reset. Consequently, the end time of the exposure period is the last timing when the transfer transistor M1 is turned off before the timing when the overflow transistor M6 is turned on. The end time of the first exposure period is appropriately set according to the duration of the first exposure period so that the first exposure period should be disposed in the middle of the frame period. The first exposure period is shorter than the third exposure period. Consequently, the end time of the first exposure period is before the time T4.

FIG. 9 schematically illustrates one example of driving pulses used for the method of driving the imaging device 100 according to the present embodiment. FIG. 9 illustrates the control signal POFG, the control signal PTx1 and the control signal PTx2, for each of the pixels 12 in the first group and the pixels 12 in the second group. When the control signal is at the high level, the corresponding transistor is on-state. When the control signal is at the low level, the corresponding transistor is off-state.

First, driving of the pixels 12 in the first group is described.

At the time T1, the frame period is started. However, the control signal POFG is at the high level, and the overflow transistor M6 is on-state. Consequently, the charge generated in the photoelectric conversion unit D1 are not accumulated. The first exposure period is started at the timing when the control signal POFG transitions from the high level to the low level, that is, the timing when the overflow transistor M6 is turned off. While the overflow transistor M6 is off-state, the charge generated in the photoelectric conversion unit D1 is accumulated in the photoelectric conversion unit D1. In the readout target pixels 12 in the first group, the overflow transistors M6 are simultaneously turned off, thereby allowing the global electronic shutter operation.

In the period during which the overflow transistor M6 is off, the control signal PTx1 is set to the high level to turn on the transfer transistor M1, thereby transferring the charge generated in the photoelectric conversion unit D1 to the holding unit C1. In the example of the present embodiment, as illustrated in FIG. 9, the transfer transistor M1 is turned on intermittently three times while the overflow transistor M6 is off-state. The reason of intermittently driving the transfer transistor M1 is analogous to that of the first embodiment.

The end time of the first exposure period is the last timing when the transfer transistor M1 is turned off before the timing when the overflow transistor M6 is turned on, as described above. In the example in FIG. 9, the falling timing of the control signal PTx1 in the third intermittent drive of the transfer transistor M1 is the end time of the first exposure period. In the readout target pixels 12 in the first group, the transfer transistors M1 are simultaneously turned off, thereby allowing the global electronic shutter operation.

The holding unit C1 can hold the charge during the third period. Consequently, the readout of the signals of the pixels 12 in the first group based on the charge generated during the first exposure period can be performed after the first exposure period, for example, after the first exposure period in the third period. The readout of the signals of the pixels 12 in the first group may be performed in the first period in the next frame as with the readout of the signals of the pixels 12 in the second group.

The driving of the pixels 12 in the first group is analogous to the first embodiment except in that the control signal POFG is always maintained at the low level. The pixels 12 in the second group may have a configuration analogous to that of the pixels 12 of the first embodiment that does not include the overflow transistors M6.

Thus, the first exposure period for the pixels 12 in the first group is arranged in the middle of the frame period, thereby allowing the temporal center of the first exposure period and the temporal center of the third exposure period to be brought close to each other. This configuration can reduce deviation in position of an object in the case of combining the image based on the signal output from the pixels 12 in the first group with the image based on the signal output from the pixels 12 in the second group. Consequently, a wide dynamic range image with small deviation in position of the object and without blocked up shadows and blown out highlights can be obtained.

[Third Embodiment]

Figure 10:
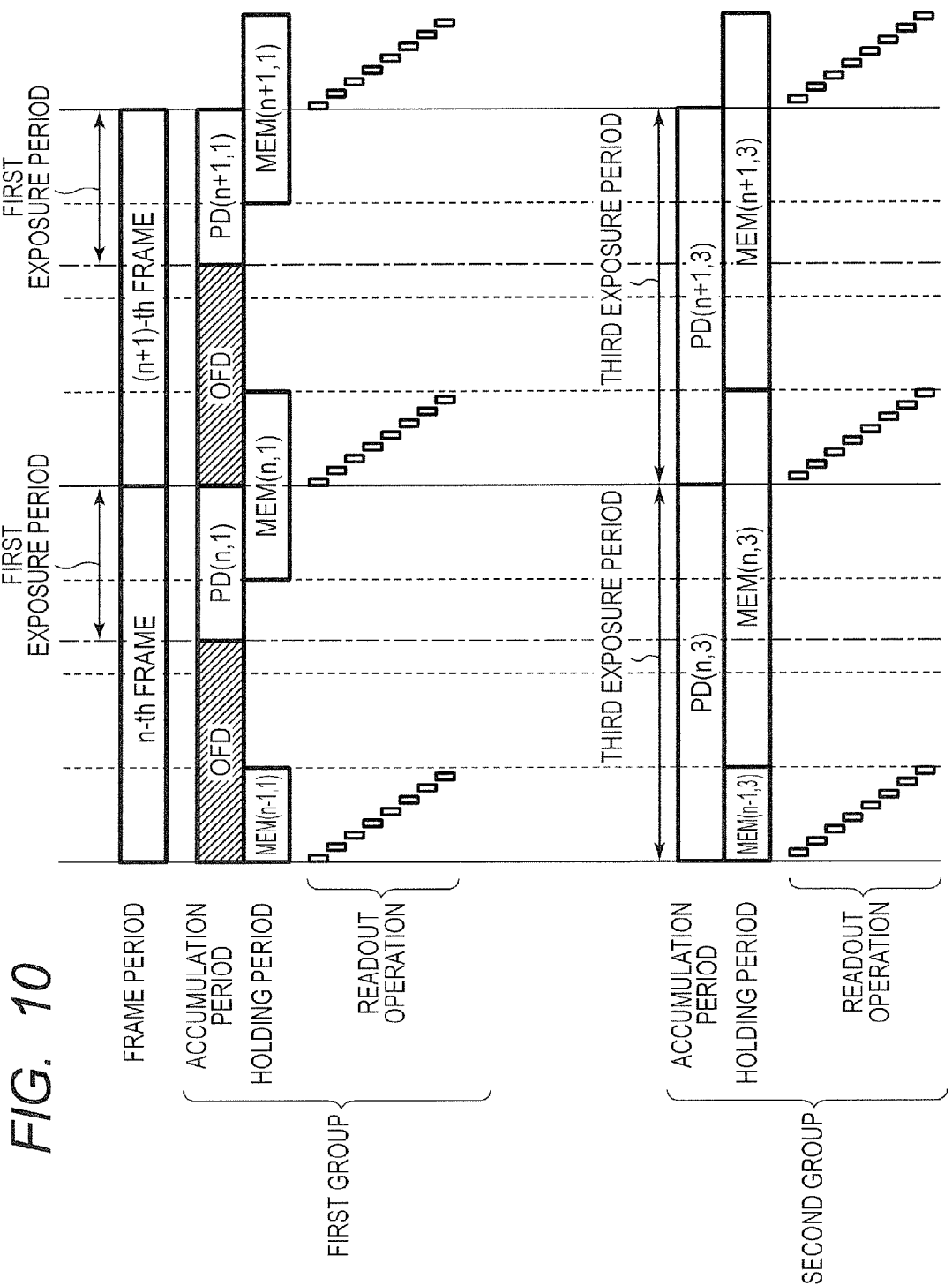
FIG. 10 is a schematic diagram illustrating an operation of an imaging device according to a third embodiment of the present invention.
Figure 11:
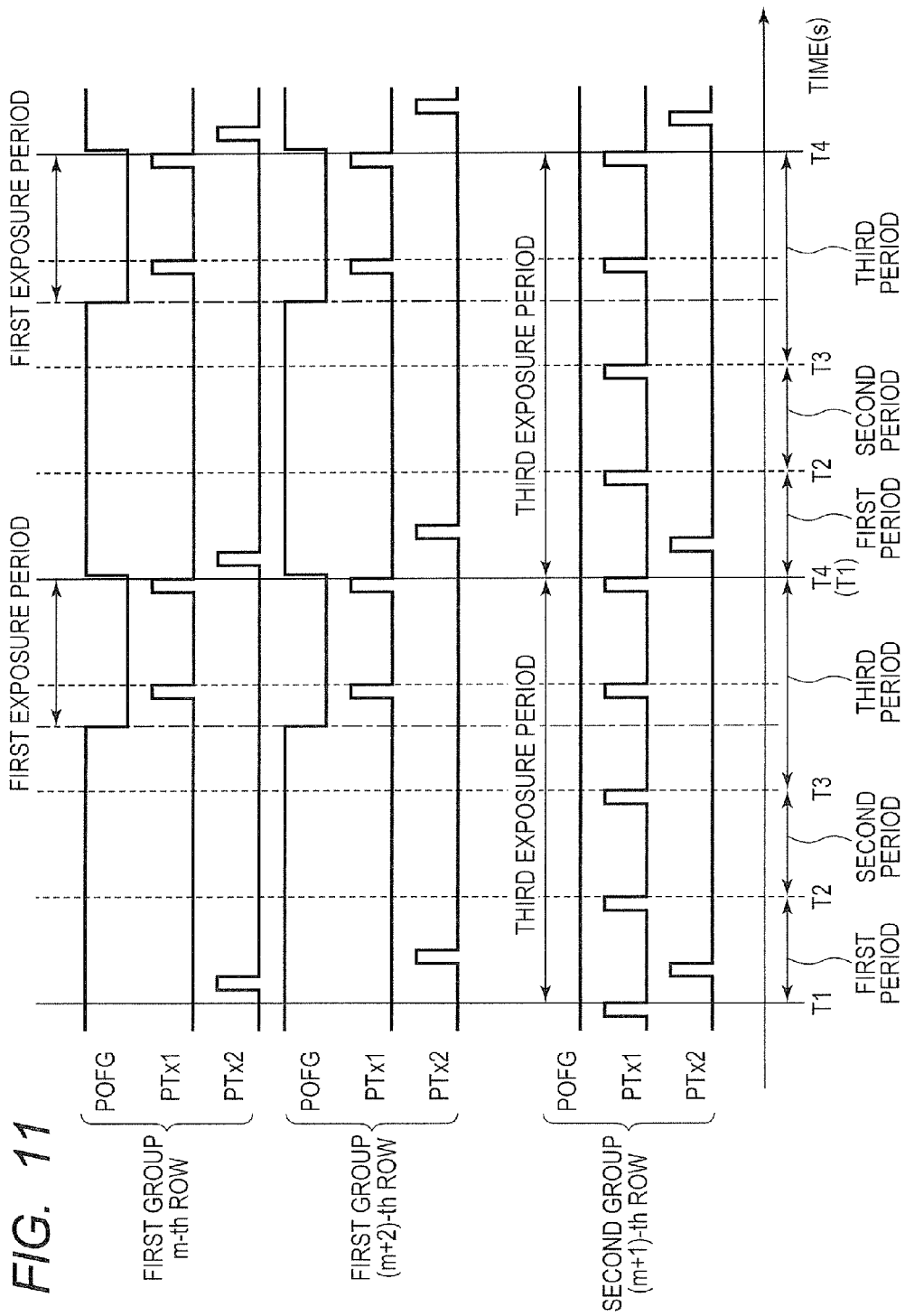
FIG. 11 is a timing chart illustrating the operation of the imaging device according to the third embodiment of the present invention.

An imaging device according to a third embodiment of the present invention is described with reference to FIGS. 10 and 11. The configuration elements analogous to those in the first and second embodiments illustrated in FIGS. 1 to 9 are assigned the same symbols. The description thereof is omitted or simplified. FIG. 10 is a schematic diagram illustrating an operation of the imaging device according to the present embodiment. FIG. 11 is a timing chart illustrating operations of the imaging device according to the present embodiment.

In the present embodiment, another method of driving the imaging device 100 according to the second embodiment that includes the pixels 12 having the circuit configuration illustrated in FIG. 7 is described. The method of driving the imaging device 100 according to the present embodiment is different from the method of driving the imaging device according to the second embodiment in that the end time of the exposure period for the pixels 12 in the first group coincides with the end time of the exposure period for the pixels 12 in the second group. The imaging operation for the pixels 12 in the second group is analogous to that of the second embodiment. Here, the points different from the driving method in the first and second embodiments are mainly described. The description on the same points is omitted or simplified.

FIG. 10 is a schematic diagram illustrating transition of the operation state of the imaging device 100 according to lapse of time. The direction from the left to the right in the diagram corresponds to the temporal axis. FIG. 10 illustrates imaging operations in the n-th frame and the (n+1)-th frame for each of the first group and the second group. According to the method of driving the imaging device of the present embodiment, both the pixels 12 in the first group and the pixels 12 in the second group are read out in the first period.

The method of driving the imaging device according to the present embodiment specifies the start time and the end time of the first exposure period so that the end time of the first exposure period for the pixels 12 in the first group should coincide with the end time of the third exposure period for the pixels 12 in the second group. As described in the second embodiment, the start time of the first exposure period can be controlled by the timing of the control signal POFG. The end time of the first exposure period can be controlled by the timing of the control signal PTx1.

More specifically, the start time of the first exposure period can be specified by the timing of first transition of the control signal POFG from the high level to the low level after start of the frame period. The control signal POFG is set to the low level and the overflow transistor M6 is turned off. Accordingly, the charge generated in the photoelectric conversion unit D1 is not discharged via the overflow transistor M6 but is accumulated in the photoelectric conversion unit D1. The start time of the first exposure period is appropriately set according to the duration of the first exposure period so that the end time of the first exposure period should be at the time T4. The first exposure period is shorter than the third exposure period. Consequently, the start time of the first exposure period is after the time T1.

The end time of the first exposure period can be specified by the timing when the control signal PTx1 transitions from the high level to the low level at the last time in the frame period, when the control signal POFG is at the low level. The exposure period is finished by the charge generated in the photoelectric conversion unit D1 being transferred to the holding unit C1. When the overflow transistor M6 is turned on, the photoelectric conversion unit D1 is reset. Consequently, the end time of the exposure period is the last timing when the transfer transistor M1 is turned off before the timing when the overflow transistor M6 is turned on. According to the driving method according to the present embodiment, the end time of the first exposure period is the time T4, and the timing when the overflow transistor M6 is turned on is after the time T4.

FIG. 11 schematically illustrates one example of driving pulses used for the method of driving the imaging device 100 according to the present embodiment. FIG. 11 illustrates the control signal POFG, the control signal PTx1 and the control signal PTx2, for each of the pixels 12 in the first group and the pixels 12 in the second group. When the control signal is at the high level, the corresponding transistor is on-state. When the control signal is at the low level, the corresponding transistor is off-state.

At the time T1, the frame period is started. However, the control signal POFG is at the high level, and the overflow transistor M6 is on-state. Consequently, the charge generated in the photoelectric conversion unit D1 is not accumulated. The first exposure period is started at the timing when the control signal POFG transitions from the high level to the low level, that is, the timing when the overflow transistor M6 is turned off. While the overflow transistor M6 is off, the charge generated in the photoelectric conversion unit D1 is accumulated in the photoelectric conversion unit D1. In the readout target pixels 12 in the first group, the overflow transistors M6 are simultaneously turned off, thereby allowing the global electronic shutter operation.

In the period during which the overflow transistor M6 is off, the control signal PTx1 is set to the high level to turn on the transfer transistor M1, thereby transferring the charge generated in the photoelectric conversion unit D1 to the holding unit C1. In the example of the present embodiment, as illustrated in FIG. 11, the transfer transistor M1 is turned on intermittently two times while the overflow transistor M6 is off. The reason of intermittently driving the transfer transistor M1 is analogous to that of the first embodiment.

The end time of the first exposure period is the last timing when the transfer transistor M1 is turned off before the timing when the overflow transistor M6 is turned on, as described above. In the example in FIG. 11, the time T4 that is the falling timing of the control signal PTx1 in the second intermittent drive of the transfer transistor M1 is the end time of the first exposure period. In the readout target pixels 12 in the first group, the transfer transistors M1 are simultaneously turned off, thereby allowing the global electronic shutter operation.

The readout of the signals of the pixels 12 in the first group based on the charge generated during the first exposure period can be performed after the first exposure period, for example, in the first period of the next frame. That is, the readout of the signals of the pixels 12 in the first group may be performed in the same period as the readout of the signals of the pixels 12 in the second group.

Consequently, the end time of the first exposure period of the pixels 12 in the first group can coincide with the end time of the third exposure period of the pixels 12 in the second group. This configuration can reduce deviation in position of an object in the case of combining the image based on the signal output from the pixels 12 in the first group with the image based on the signal output from the pixels 12 in the second group. Consequently, a wide dynamic range image with small deviation in position of the object and without blocked up shadows and blown out highlights can be obtained. The readout of the signals in the pixels 12 in the first group and the readout of the signals in the pixels 12 in the second group are performed in the same period, which can reduce the number of scans of the readout circuit. Consequently, the power consumption can be reduced.

[Fourth Embodiment]

Figure 12:
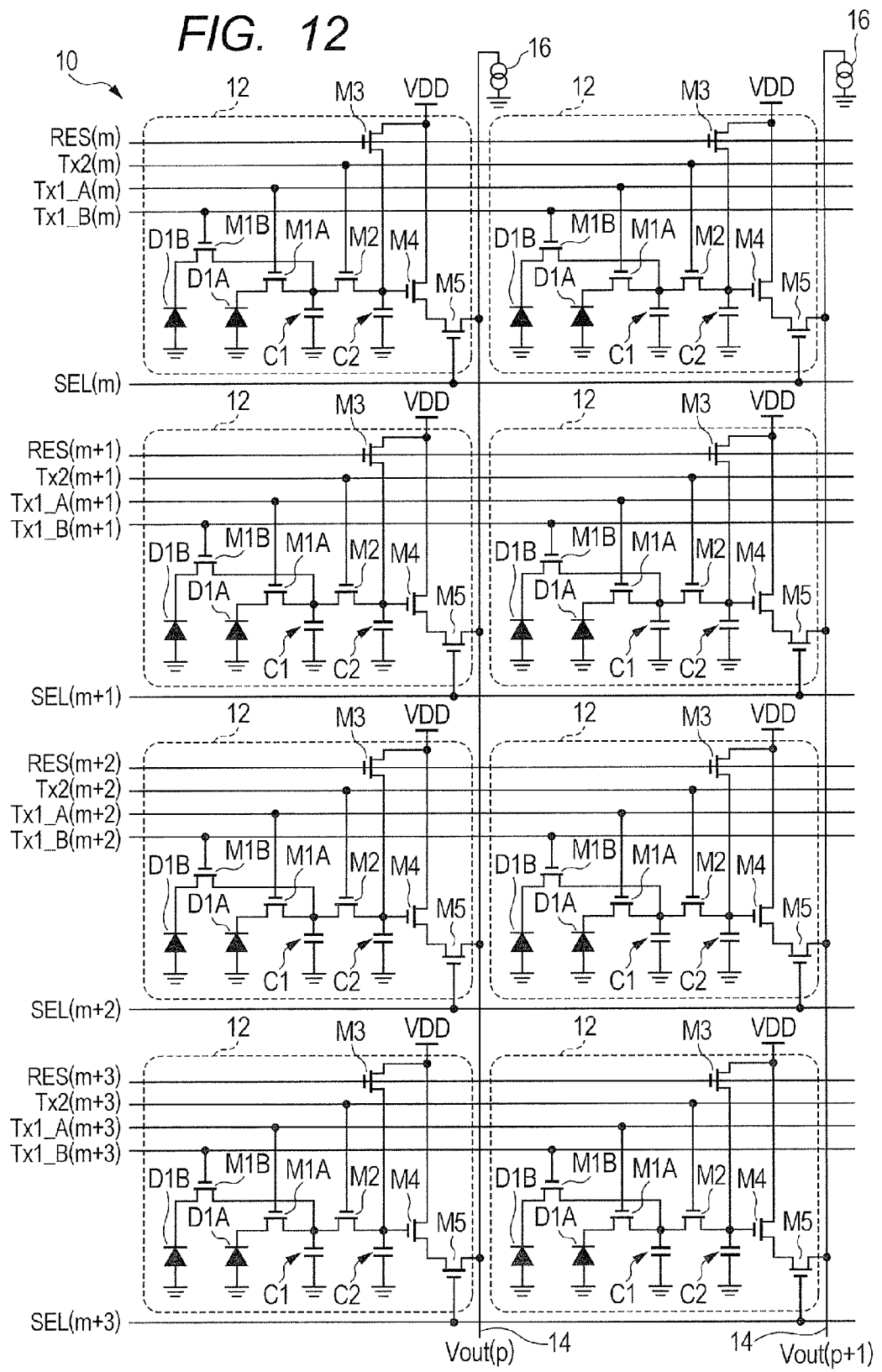
FIG. 12 is a diagram illustrating a configuration example of an imaging device according to a fourth embodiment of the present invention.
Figure 13:
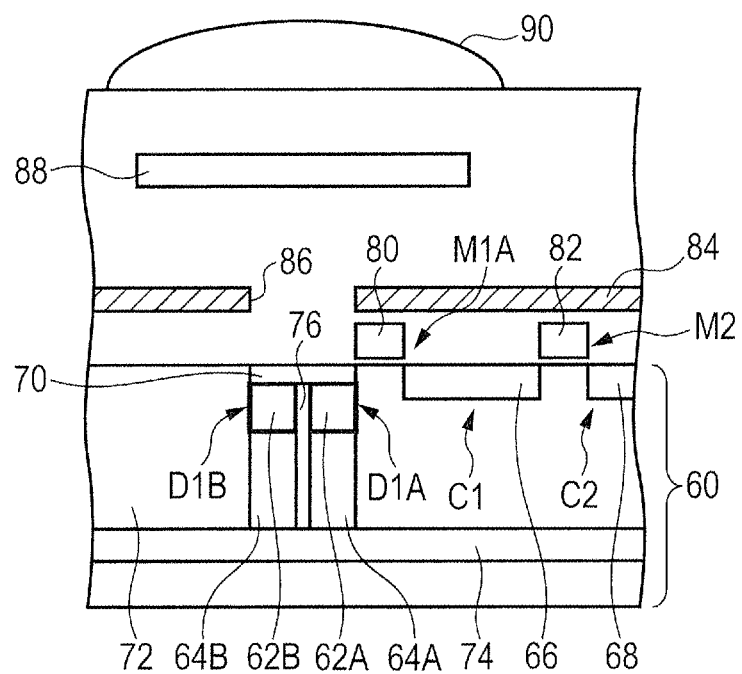
FIG. 13 is a diagram illustrating a cross-sectional structure of a pixel of the imaging device according to the fourth embodiment of the present invention.
Figure 14:
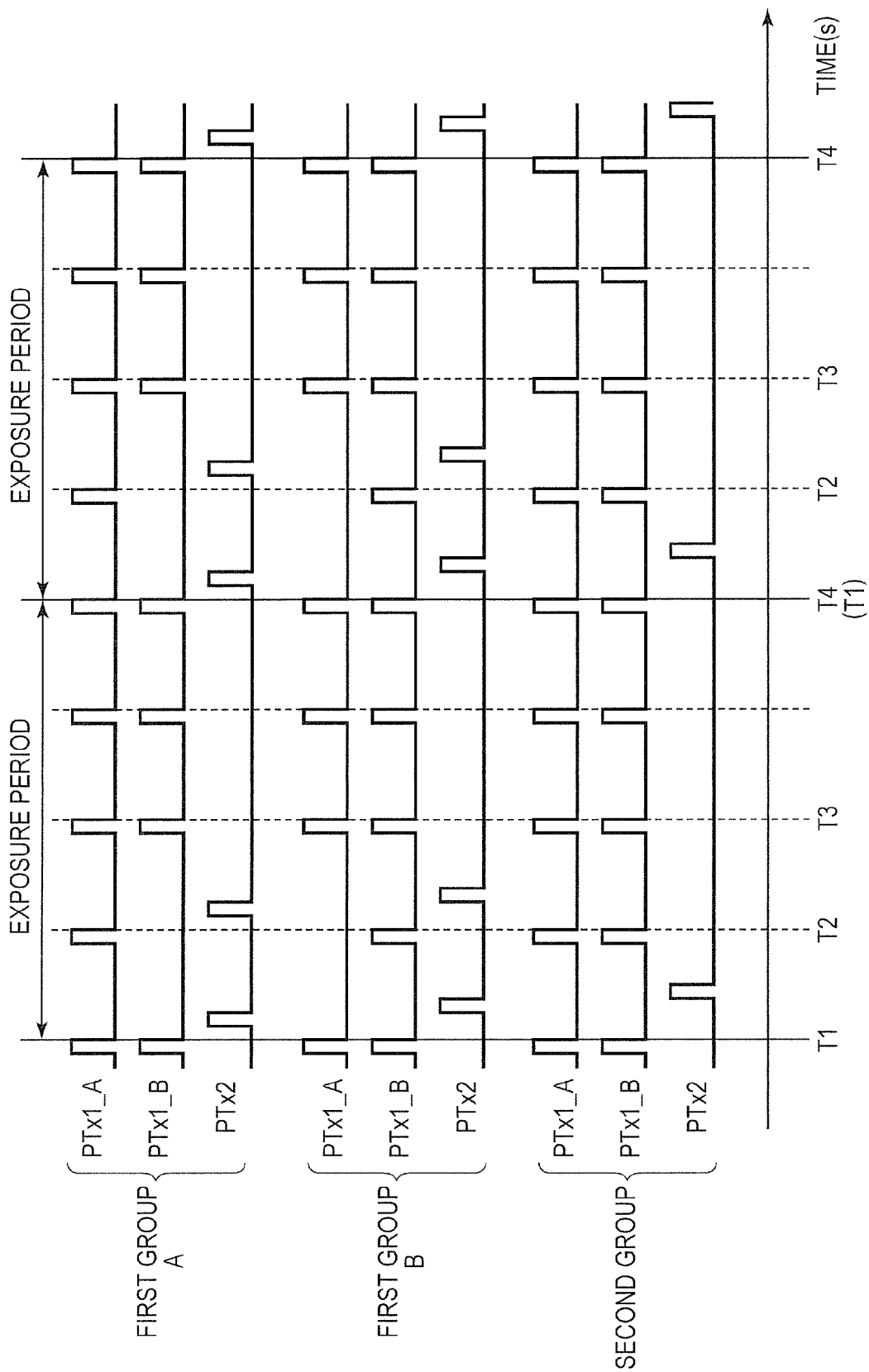
FIG. 14 is a timing chart illustrating an operation of the imaging device according to the fourth embodiment of the present invention.

An imaging device according to a fourth embodiment of the present invention is described with reference to FIGS. 12 to 14. The configuration elements analogous to those in the first to third embodiments illustrated in FIGS. 1 to 11 are assigned the same symbols. The description thereof is omitted or simplified. FIG. 12 is a circuit diagram illustrating a configuration example of a pixel circuit of the imaging device according to the present embodiment. FIG. 13 is a schematic diagram illustrating a cross-sectional structure of the imaging device according to the present embodiment. FIG. 14 is a timing chart illustrating control signals of the imaging device according to the present embodiment.

First, the configuration of an imaging device 100 according to the present embodiment is described with reference to FIGS. 12 and 13.

The imaging device 100 according to the present embodiment is analogous to the imaging device 100 according to the first embodiment except in that the circuit configuration of the pixel 12 is different. The pixel 12 of the imaging device 100 according to the present embodiment includes two photoelectric conversion units D1A and D1B, as illustrated in FIG. 12. A transfer transistor M1A for transferring charge from the photoelectric conversion unit D1A to the holding unit C1, and a transfer transistor M1B for transferring charge from the photoelectric conversion unit D1B to the holding unit C1 are also included.

An anode of a photodiode constituting the photoelectric conversion unit D1A is connected to a ground voltage line. A cathode of the photodiode is connected to a source of the transfer transistor M1A. An anode of a photodiode constituting the photoelectric conversion unit D1B is connected to a ground voltage line. A cathode of the photodiode is connected to a source of the transfer transistor M1B. A drain of the transfer transistor M1A and a drain of the transfer transistor M1B are connected to the source of the transfer transistor M2. The other configuration of the pixel 12 is analogous to that of the pixel 12 of the imaging device 100 according to the first embodiment.

On each row of the pixel array of the pixel array unit 10, a control line Tx1_A and a control line Tx1_B are arranged in a manner extending in the row direction. The control line Tx1_A is connected to a gate of the transfer transistor M1A of each of the pixels 12 arranged in the row direction, and constitutes a signal line common to these pixels 12. The control line Tx1_B is connected to a gate of the transfer transistor M1B of each of the pixels 12 arranged in the row direction, and constitutes a signal line common to these pixels 12.

The control line Tx1_A and the control line Tx1_B are connected to the vertical driving circuit 20. A control signal PTx1_A, which is driving pulses for controlling the transfer transistor M1A, is output to the control line Tx1_A from the vertical driving circuit 20. A control signal PTx1_B, which is driving pulses for controlling the transfer transistor M1B, is output to the control line Tx1_B from the vertical driving circuit 20. In a typical example, when a high-level control signal is output from the vertical driving circuit 20, the corresponding transistor is on-state. When a low-level control signal is output from the vertical driving circuit 20, the corresponding transistor is off-state.

FIG. 13 schematically illustrates a partial cross-sectional structure of the pixel 12 of the imaging device according to the present embodiment. FIG. 13 illustrates a front side surface irradiation type imaging device as an example. Alternatively, the device may be a back side surface irradiation type imaging device.

N-type semiconductor regions 62A, 62B, 64A, 64B, 66 and 68 and p-type semiconductor regions 70, 72, 74 and 76 are provided in an n-type semiconductor substrate 60. The photoelectric conversion unit D1A has an embedded type photodiode structure made up of a p-n junction between the n-type semiconductor region 62A and the p-type semiconductor region 70. The photoelectric conversion unit D1B has an embedded type photodiode structure made up of a p-n junction between the n-type semiconductor region 62B and the p-type semiconductor region 70. An isolation region 19 made up of the p-type semiconductor region 76 is provided between the photoelectric conversion unit D1A and the photoelectric conversion unit D1B. The isolation region 19 is not necessarily configured to have a uniform concentration. The p-type semiconductor region 70 can reduce the noise on the surface part of the semiconductor substrate 60.

The p-type semiconductor region 72 constitutes a well. Under the n-type semiconductor regions 62A and 62B, the respective n-type semiconductor regions 64A and 64B are arranged. The impurity concentrations of the n-type semiconductor regions 64A and 64B are lower than the impurity concentrations of the n-type semiconductor regions 62A and 62B. Consequently, the charge generated at deep positions in the semiconductor substrate 60 are collected into the n-type semiconductor regions. Instead of the n-type semiconductor regions 64A and 64B, p-type semiconductor regions may be provided. Under the n-type semiconductor regions 64A and 64B, the p-type semiconductor region 74 serving as a potential barrier against charge is arranged.

The holding unit C1 includes the n-type semiconductor region 66. The n-type semiconductor region 66 holds charge that are to be signals. The impurity concentration of the n-type semiconductor region 66 is higher than the impurity concentrations of the n-type semiconductor regions 62A and 62B. The holding unit C2 includes the n-type semiconductor region 68.

A gate electrode 80 is provided over the semiconductor substrate 60 between the n-type semiconductor region 62A and the n-type semiconductor region 66 with an insulating film interposed therebetween. The gate electrode 80 constitutes the gate of the transfer transistor M1A. The n-type semiconductor region 62A and the n-type semiconductor region 66 also function as the source and drain of the transfer transistor M1A.

A gate electrode 82 is provided over the semiconductor substrate 60 between the n-type semiconductor region 66 and the n-type semiconductor region 68 with an insulating film interposed therebetween. The gate electrode 82 constitutes the gate of the transfer transistor M2. The n-type semiconductor region 66 and the n-type semiconductor region 68 also function as the source and drain of the transfer transistor M2.

A light shield film 84 having an opening 86 above the photoelectric conversion units D1A and D1B is provided over the semiconductor substrate 60. The holding unit C1 is light-shielded by the light shield film 84. The light shield film 84 is formed of metal resistant to light penetration with respect to visible light, such as tungsten or aluminum. A color filter 88 and a microlens 90 are arranged over the opening 86 of the light shield film 84.

In the example in FIG. 13, light-shield for the holding unit C1 is performed by the light shield film 84. Alternatively, light may be shielded using another interconnection layer. Alternatively, light may be shielded by the light shield film 84 and the other interconnection layer. The holding unit C1 and the gate electrode 80 do not necessarily have the illustrated configuration. For example, the gate electrode 80 may extend over the holding unit C1. Alternatively, p-type semiconductor regions analogous to the photoelectric conversion units D1A and D1B may be provided on upper parts of the holding unit C1.

The photoelectric conversion unit D1A and the photoelectric conversion unit D1B are arranged so as to be substantially conjugate with a pupil of the lens. The photoelectric conversion unit D1A and the photoelectric conversion unit D1B receive light fluxes having passed through different positions on the pupil of the lens. This configuration allows the focus to be detected. The configuration may also be used as a pixel for taking an image by adding the signal of the photoelectric conversion unit D1A and the signal of the photoelectric conversion unit D1B. That is, the configuration illustrated in FIG. 13 may be used as a pixel for focus detection and a pixel for imaging.

Next, a method of driving the imaging device 100 according to the present embodiment is described with reference to FIG. 14.

The method of driving the imaging device 100 according to the present embodiment divides the pixels 12 in the first group into a group A where the transfer transistor M1A is driven first in each frame period, and a group B where the transfer transistor M1B is driven first in each frame period. In the same frame period, the first group A, the first group B and the second group perform different imaging operations. The pixels 12 in the first group A and the pixels 12 in the first group B are pixels for outputting a signal for focus detection. The pixels 12 in the second group are pixels for outputting a signal for an image.

FIG. 14 schematically illustrates one example of driving pulses used for the method of driving the imaging device 100 according to the present embodiment. FIG. 14 illustrates the control signal PTx1_A, the control signal PTx1_B and the control signal PTx2, for each of the first group A, the first group B and the second group. When the control signal is at the high level, the corresponding transistor is on-state. When the control signal is at the low level, the corresponding transistor is off-state.

First, driving of the pixels 12 in the first group is described.

The imaging operations in the pixels 12 in the first group A and the pixels 12 in the first group B are basically the same as the imaging operation in the pixels 12 in the first group of the first embodiment. As to the pixels 12 in the first group A, the control signal PTx1 of the first embodiment corresponds to the control signal PTx1_A. The control signal PTx1_B is analogous to the control signal PTx1_A except in that the signal is maintained to the low level during the first period. As to the pixels 12 in the first group B, the control signal PTx1 of the first embodiment corresponds to the control signal PTx1_B. The control signal PTx1_A is analogous to the control signal PTx1_B except in that the signal is maintained to the low level during the first period. The control signal PTx2 is the same as the control signal PTx2 of the first embodiment.

According to such an imaging operation, a signal based on charge generated in the photoelectric conversion unit D1A during the first period is output from the pixels 12 in the first group A during the second period. A signal based on charge generated in the photoelectric conversion unit D1B during the first period is output from the pixels 12 in the first group B during the second period. These signals can be output before the time T4 when the exposure time for one frame is finished. More specifically, the signal readout can be completed in the second period. Consequently, an operation for focus detection is performed using the signals obtained here, thereby allowing the focus to be detected at high speed.

Next, driving of the pixels 12 in the second group is described.

The pixels 12 in the second group are pixels for outputting the signal for an image. Thus, unlike the imaging operation in the pixels 12 in the first group, the charge is simultaneously transferred from the photoelectric conversion unit D1A and the photoelectric conversion unit D1B to the holding unit C1. That is, as illustrated in FIG. 14, the transfer transistor M1A provided between the photoelectric conversion unit D1A and the holding unit C1 and the transfer transistor M1B provided between the photoelectric conversion unit D1B and the holding unit C1 are driven in synchronization. Consequently, the charge generated in the photoelectric conversion unit D1A and the charge generated in the photoelectric conversion unit D1B are added in the holding unit C1. The charge generated in the total period of the first period, the second period and the third period are output in the first period of the next frame.

No signal for an image can be obtained from the pixels 12 in the first group A and the pixels 12 in the first group B. However, from output data of the pixels 12 in the second group residing around these pixels 12, interpolated data at the positions of the pixels 12 in the first group A and the pixels 12 in the first group B can be generated.

It is appropriate to execute the readout operations from the pixels 12 in the first group A and the pixels 12 in the first group B for obtaining the signal for focus detection, at the first readout among the multiple times of readout performed in one frame. It is appropriate to execute the readout operation from the pixels 12 in the second group for obtaining the signal for an image, at the last readout among the multiple times of readout performed in one frame. For example, according to the present embodiment that outputs the signal for focus detection in the second period in this frame and outputs the imaging signal in the first period in the next frame, the signal for focus detection can be obtained before output of the imaging signal. Consequently, the focus detection operation can be performed at high speed.

According to such a configuration, the signal for focus detection can be output before output of the signal for an image while the global electronic shutter operation is performed, and the focus detection operation can be performed at high speed.

As with the arrangement of the pixels 12 in the first group and the pixels 12 in the second group illustrated in FIGS. 3A to 3F, the pixels 12 in the first group A, the pixels 12 in the first group B and the pixels 12 in the second group may be arranged in any of various arrangements. In such a case, it is only required that substantially identical numbers of pixels 12 in the first group A and pixels 12 in the first group B, which are for outputting the signal for focus detection, be included in the first groups. It is appropriate that the pixel 12 in the first group A and the pixel 12 in the first group B reside at positions close to each other in the pixel array, and have relationship of making pairs. The pairs of the pixel 12 in the first group A and the pixel 12 in the first group B may be discretely arranged in the pixel array unit 10. Alternatively, all the pixels 12 on predetermined rows or columns in the pixel array may be made up of the pixels 12 in the first group A and the pixels 12 in the first group B.

Not all the pixels 12 constituting the pixel array unit 10 are necessarily made up of pixels 12 each having plural photoelectric conversion units D1. Alternatively, at least only the pixels 12 for obtaining the signal for focus detection may be made up of the pixels 12 each having plural photoelectric conversion units D1.

[Fifth Embodiment]

Figure 15A:
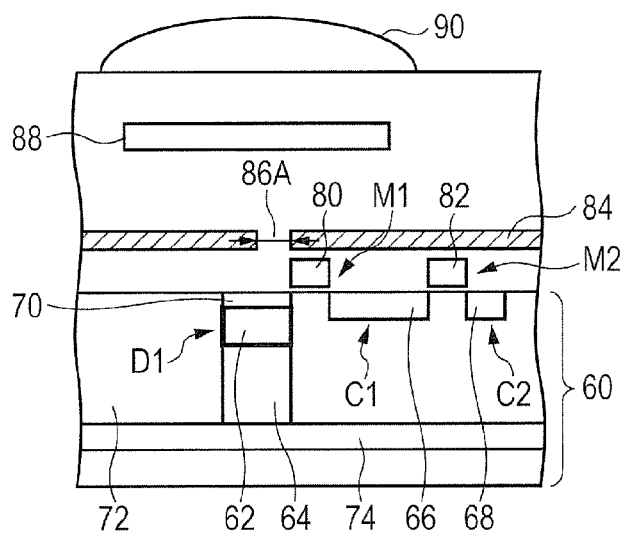
FIGS. 15A, 15B and 15C are diagrams illustrating a cross-sectional structure of a pixel of an imaging device according to a fifth embodiment of the present invention.
Figure 15B:
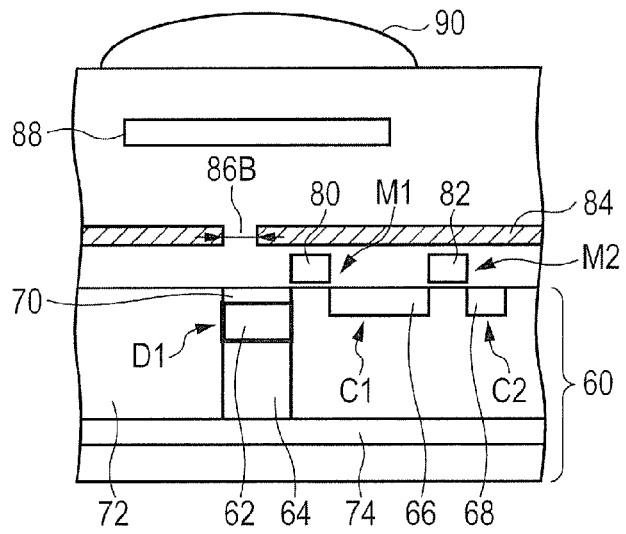
Figure 15C:
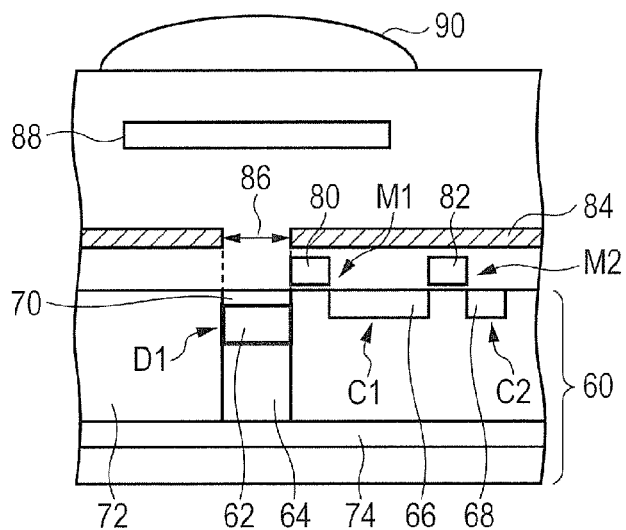

An imaging device according to a fifth embodiment of the present invention is described with reference to FIGS. 15A to 15C. The configuration elements analogous to those in the first to fourth embodiments illustrated in FIGS. 1 to 14 are assigned the same symbols. The description thereof is omitted or simplified. FIGS. 15A to 15C are schematic diagrams illustrating a cross-sectional structure of the imaging device according to the present embodiment.

As to the imaging device according to the fourth embodiment, the example is described that obtains the focus detection signal using the imaging device 100 including two photoelectric conversion units D1A and D1B in one pixel 12. However, the pixel 12 does not necessarily include two photoelectric conversion units D1A and D1B. A pixel 12 that includes a photoelectric conversion unit D1 for selectively detecting light in a first pupil region, and a pixel 12 that includes a photoelectric conversion unit D1 for selectively detecting light in a second pupil region different from the first pupil region may be provided instead of the two photoelectric conversion units for detecting light in pupil regions different from each other.

FIGS. 15A to 15C illustrate examples where the pupil region through which the photoelectric conversion unit performs detection is changed by the light shield film 84. FIG. 15A illustrates an example where the light shield film 84 is provided with an opening 86A so that light having passed through a part of the region (first pupil region) of the pupil of the lens should be selectively detected by the photoelectric conversion unit D1. FIG. 15B illustrates an example where the light shield film 84 is provided with an opening 86B so that light having passed through another part of the region (second pupil region) of the pupil of the lens should be selectively detected by the photoelectric conversion unit D1. FIG. 15C illustrates an example where a light shield film 84 having an opening 86 is provided in a region corresponding to the opening 86A and the opening 86B so that light having passed through the first pupil region and the second pupil region should be detected by the photoelectric conversion unit D1. In this case, the pixel having the configuration in FIG. 15A and the pixel having the configuration in FIG. 15B can be used as a pair of pixels 12 for outputting the signal for focus detection, and the pixel 12 having the configuration in FIG. 15C can be used as a pixel for outputting the signal for an image.

Consequently, for example, the pixels 12 in the first group A adopt the configuration in FIG. 15A, the pixels 12 in the first group B adopt the configuration in FIG. 15B, and the pixels 12 in the second group adopt the configuration in FIG. 15C, thereby a function analogous to that of the fourth embodiment to be achieved. In this case, in the pixels 12 in the first group A, the transfer transistor M1 may be driven by the control signal PTx1_A in FIG. 14, in the pixels 12 in the first group B, the transfer transistor M1 may be driven by the control signal PTx1_B in FIG. 14.

[Sixth Embodiment]

An imaging system according to a sixth embodiment of the present invention is described with reference to FIG. 16. The configuration elements analogous to those in the first to fifth embodiments illustrated in FIGS. 1 to 15C are assigned the same symbols. The description thereof is omitted or simplified. FIG. 16 is a block diagram illustrating a configuration of an imaging system according to the present embodiment.

The imaging devices 100 described in the first to fifth embodiments are applicable to various imaging systems. Examples of imaging systems to which the embodiments are applicable include a digital still camera, a digital camcorder, a monitoring camera, a copier, a facsimile, a mobile phone, a vehicle-mounted camera and an observatory satellite. The imaging systems also include a camera module that includes an optical system, such as a lens, and an imaging device. FIG. 16 exemplifies a block diagram of a digital still camera, which is an example of the above items.

The imaging system 200 exemplified in FIG. 16 includes an imaging device 100, a lens 202 that causes the imaging device 100 to form an optical image of an object, an aperture 204 for changing the amount of light passing through the lens 202, and a barrier 206 for protecting the lens 202. The lens 202 and the aperture 204 are optical systems for condensing light in the imaging device 100. The imaging device 100 is any of the imaging devices 100 described in the first to fifth embodiments, and converts the optical image formed through the lens 202 into image data.

The imaging system 200 further includes a signal processing unit 208 that processes an output signal output from the imaging device 100. The signal processing unit 208 performs AD conversion that converts an analog signal output from the imaging device 100 into a digital signal. Furthermore, the signal processing unit 208 performs various correction and compression processes to output image data as required. The AD converter, which is a part of the signal processing unit 208, may be formed on a semiconductor substrate on which the imaging device 100 is provided. Alternatively, the AD converter may be formed on a semiconductor substrate other than that for the imaging device 100. The imaging device 100 and the signal processing unit 208 may be formed on the same semiconductor substrate.

The imaging system 200 further includes a memory unit 210 for temporarily storing the image data, and an external interface unit (external I/F unit) 212 for communication with an external computer. The imaging system 200 further includes a storage medium 214, such as a semiconductor memory, where imaged data is stored or read, and a storage medium control interface unit (storage medium control I/F unit) 216 for recording and reading the data in and from the storage medium 214. The storage medium 214 may be embedded in the imaging system 200, or removably attached thereto.

The imaging system 200 further includes a general control/operation unit 218 that performs various calculations and controls the entire digital still camera, and a timing generating unit 220 that outputs various timing signals to the imaging device 100 and the signal processing unit 208. Here, the timing signal may be input from the outside. The imaging system 200 is only required to include at least the imaging device 100, and the signal processing unit 208 that processes an output signal output from the imaging device 100.

The imaging device 100 outputs the imaging signal to the signal processing unit 208. The signal processing unit 208 applies predetermined signal processing to the imaging signal output from the imaging device 100, and outputs image data. The imaging device 100 of the fourth or fifth embodiment also outputs the signal for focus detection based on the signal output from the pixel for focus detection, and the imaging signal, to the signal processing unit 208. The signal processing unit 208 detects whether focusing is achieved or not using the signal for focus detection. The signal processing unit 208 generates an image using the imaging signal. When the signal processing unit 208 detects that focusing is not achieved, the general control/operation unit 218 drives the optical system in the direction for achieving focusing. The signal processing unit 208 detects again whether focusing is achieved or not using the signal for focus detection output from the imaging device 100. Hereinafter, the imaging device 100, the signal processing unit 208 and the general control/operation unit 218 repeat the operation until focusing is achieved.

In the case of obtaining the wide dynamic range image, the general control/operation unit 218 executes a process of combining the image data based on the output signal from the pixels 12 in the first group with the image data based on the output signal from the pixels 12 in the second group.

Application of any of the imaging devices 100 according to the first to fifth embodiments can achieve the imaging system capable of obtaining a wide dynamic range image that has small deviation in object position without blocked up shadows and blown out highlights. Furthermore, the imaging system capable of a high-speed focus detection operation can be achieved.

[Variation Embodiment]

The present invention is not limited to the above embodiments. Alternatively, the present invention can be variously modified.

For example, in the above embodiments, the description has been made, exemplifying the imaging device that includes the photoelectric conversion units D1 for generating electrons as signal charge. Alternatively, the technique is also applicable to an imaging device that includes photoelectric conversion units D1 for generating holes as signal charge in an analogous manner. In this case, the conductive types of the transistors constituting the pixels 12 are reverse conductivity types. The representation of the sources and drains of the transistors described in the above embodiments may be different in view of the conductivity types of the transistors and the functions concerned. All or some of the sources and drains may sometimes be called reversed names.

In the first to fifth embodiments, the exposure period for the pixels 12 in the second group (third exposure period) is substantially identical to the frame period. However, these periods are not necessarily the same. As with the exposure period for the pixels 12 in the first group, the exposure period for the pixels 12 in the second group may have a start time after the time T1 or an end time before the time T4. For example, the pixel configuration including the overflow transistor M6 as described in the second or third embodiment allows the start time and end time of the exposure period to be easily changed.

According to the first to fifth embodiments, the exposure period for the pixels 12 in the first group (the first exposure period, and the second exposure period) is included in the exposure period for the pixels 12 in the second group (third exposure period). The period is not necessarily included. In a state where at least a part of the exposure period for the pixels 12 in the first group overlaps with at least a part of the exposure period for the pixels 12 in the second group, a wide dynamic range image with a small deviation in object position can be obtained.

According to the second and third embodiments, the start times of the first exposure period and the third exposure period are controlled by the drive timing for the overflow transistor M6. However, for example, in the case of taking a still image, the start times of the first exposure period and the third exposure period are not necessarily controlled by the drive timing for the overflow transistor M6. In the case of taking a still image, the accumulated charges of the previous frame are not necessarily held in the holding unit C1. Consequently, the photoelectric conversion unit D1 may be initialized by the reset transistor M3 through the holding units C1 and C2.

According to the fourth embodiment, the signal for focus detection is detected before the imaging signal is obtained. The signal for focus detection is not necessarily obtained before the imaging signal is obtained.

Furthermore, according to the fourth embodiment, the signal for focus detection is obtained from the pixels 12 in the first group. Alternatively, pixels 12 for outputting the imaging signal may be added besides the pixels 12 in the first group A and the pixels 12 in the first group B. The pixel 12 can perform the imaging operation in a manner analogous to that of the pixels 12 in the first group of the first embodiment except in that driving is performed according to the control signals PTx1_A and PTx1_B in synchronization with each other. A short accumulation time signal usable for a wide dynamic range image can be output from the pixel 12.

The imaging system described in the sixth embodiment is an example of the imaging system to which the imaging device of the present invention is applicable. The imaging system to which the imaging device of the present invention is applicable is not limited to that having the configuration illustrated in FIG. 16.

[Other Embodiments]

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-179347, filed Sep. 11, 2015, which is hereby incorporated by reference herein in its entirety.

What is claimed is:

1. An imaging device comprising:
a plurality of pixels, each of the plurality of pixels including a photoelectric conversion unit that generates charge by photoelectric conversion, a holding unit that holds charge transferred from the photoelectric conversion unit, and an amplifier unit that outputs a signal based on charge transferred from the holding unit, wherein
the plurality of pixels includes
a first group including the pixel that outputs a signal based on charge generated in the photoelectric conversion unit during a first exposure period in each of frames, and
a second group including the pixel that outputs a signal based on charge generated in the photoelectric conversion unit during a second exposure period in each of the frames,
the second exposure period is longer than the first exposure period, and at least a part of the second exposure period overlaps with the first exposure period, and
the pixel belonging to the second group includes in the second exposure period
a first period during which the charge generated in the photoelectric conversion unit is accumulated in the photoelectric conversion unit, and the charge held by the holding unit is transferred to the amplifier unit, and a second period during which the charge generated in the photoelectric conversion unit during the first period is held in the holding unit, and the charge generated in the photoelectric conversion unit after the first period is held by one of the photoelectric conversion unit and the holding unit.

2. The imaging device according to claim 1, wherein in the pixel belonging to the second group, the charge generated in the photoelectric conversion unit during the first period and the second period is held by the holding unit in the first period in a next frame.

3. The imaging device according to claim 1, wherein the pixel belonging to the first group has a fourth period during which the charge generated in the photoelectric conversion unit during the first exposure period are held by the holding unit after the first exposure period, and the charge held by the holding unit is transferred to the amplifier unit during the fourth period.

4. The imaging device according to claim 3, wherein the fourth period is performed in one of the second period and in the first period in a next frame.

5. The imaging device according to claim 1, wherein the charge generated in the photoelectric conversion unit during the second period is intermittently transferred to the holding unit during the second period.

6. The imaging device according to claim 1, wherein the first exposure periods for the pixels belonging to the first group coincide with each other, and the second exposure periods for the pixels belonging to the second group coincide with each other.

7. The imaging device according to claim 1, wherein a start time of the first exposure period coincides with a start time of the second exposure period.

8. The imaging device according to claim 1, wherein a temporal center of the first exposure period coincides with a temporal center of the second exposure period.

9. The imaging device according to claim 1, wherein an end time of the first exposure period coincides with an end time of the second exposure period.

10. The imaging device according to claim 1, wherein a wide dynamic range image is obtained from a first image based on the signal output from the pixels in the first group and a second image based on the signal output from the pixels in the second group.

11. The imaging device according to claim 1, wherein the first group includes a first pixel that outputs a signal based on light passing through a first pupil region, and a second pixel that outputs a signal based on light passing through a second pupil region different from the first pupil region.

12. The imaging device according to claim 11, wherein the first pixel and the second pixel respectively include a first photoelectric conversion element that photoelectrically converts the light passing through the first pupil region, and a second photoelectric conversion element that photoelectrically converts the light passing through the second pupil region.

13. The imaging device according to claim 11, further comprising
a light shield film that allows the light passing through the first pupil region to selectively enter the photoelectric conversion unit of the first pixel, and allows the light passing through the second pupil region to selectively enter the photoelectric conversion unit of the second pixel.

14. The imaging device according to claim 11, wherein a signal for focus detection is obtained based on the signal output from the first pixel and the second pixel in the first group, and an imaging signal is obtained based on the signals output from the pixels in the second group.

15. The imaging device according to claim 1, wherein in each frame, the pixel belonging to the first group outputs the signal based on the charge generated in the photoelectric conversion unit during the first exposure period, and a signal based on the charge generated in the photoelectric conversion unit during a third exposure period different from the first exposure period.

16. A method of driving an imaging device including a plurality of pixels, each of the plurality of pixels including a photoelectric conversion unit that generates charge by photoelectric conversion, a holding unit that holds charge transferred from the photoelectric conversion unit, and an amplifier unit that outputs a signal based on charge transferred from the holding unit, wherein the method comprises:
for the pixel belonging to a first group of the plurality of pixels,
accumulating in the photoelectric conversion unit charge generated in the photoelectric conversion unit during a first exposure period in each frame, and
after the first exposure period, transferring from the holding unit to the amplifier unit the charge generated in the photoelectric conversion unit during the first exposure period, and
for the pixel belonging to a second group of the plurality of pixels,
during a first period in a second exposure period in each frame, accumulating in the photoelectric unit the charge generated in the photoelectric conversion unit, and transferring to the amplifier unit the charge held by the holding unit,
during a second period in the second exposure period, holding in the holding unit the charge generated in the photoelectric conversion unit during the first period, and holding by one of the photoelectric conversion unit and the holding unit the charge generated in the photoelectric conversion unit during the second period, and
after the second exposure period, transferring from the holding unit to the amplifier unit the charge generated in the photoelectric conversion unit during the first period and the second period.

17. An imaging system comprising:
an imaging device; and
a signal processing unit that processes a signal from the imaging device, wherein
the imaging device includes a plurality of pixels, each of the plurality of pixels including a photoelectric conversion unit that generates charge by photoelectric conversion, a holding unit that holds charge transferred from the photoelectric conversion unit, and an amplifier unit that outputs a signal based on charge transferred from the holding unit, wherein
the plurality of pixels includes
a first group including the pixel that outputs a signal based on charge generated in the photoelectric conversion unit during a first exposure period in each of frames, and
a second group including the pixel that outputs a signal based on charge generated in the photoelectric conversion unit during a second exposure period in each of the frames, the second exposure period is longer than the first exposure period, and at least a part of the second exposure period overlaps with the first exposure period, and the pixel belonging to the second group includes in the second exposure period a first period during which the charge generated in the photoelectric conversion unit is accumulated in the photoelectric conversion unit, and the charge held by the holding unit is transferred to the amplifier unit, and a second period during which the charge generated in the photoelectric conversion unit during the first period is held in the holding unit, and the charge generated in the photoelectric conversion unit after the first period is held by one of the photoelectric conversion unit and the holding unit.

18. The imaging system according to claim 17, wherein the signal processing unit generates a focus detection signal based on the signal output from the pixels in the first group.

19. The imaging system according to claim 17, wherein the signal processing unit obtains a wide dynamic range image from a first image based on the signal output from the pixels in the first group and a second image based on the signal output from the pixels in the second group.

* * * * *